United States Patent
Calvert et al.

(10) Patent No.: US 11,790,364 B2
(45) Date of Patent: Oct. 17, 2023

(54) SYSTEMS AND METHODS FOR PROVIDING MULTI-FACTOR AUTHENTICATION FOR VEHICLE TRANSACTIONS

(71) Applicant: Rovi Guides, Inc., San Jose, CA (US)

(72) Inventors: Peter Jason Calvert, Limerick, PA (US); Christopher Lidaka, Apex, NC (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/913,694

(22) Filed: Jun. 26, 2020

(65) Prior Publication Data
US 2021/0406894 A1 Dec. 30, 2021

(51) Int. Cl.
*G06Q 20/40* (2012.01)

(52) U.S. Cl.
CPC ..... *G06Q 20/4014* (2013.01); *G06Q 20/4012* (2013.01); *G06Q 20/40145* (2013.01)

(58) Field of Classification Search
CPC .......... G06Q 20/4014; G06Q 20/4012; G06Q 20/40145; G06Q 20/0655; G06Q 20/0855; G06Q 20/127; G06Q 20/204; G06Q 20/322; G06Q 20/3224; G06Q 20/405; G06Q 20/4097
See application file for complete search history.

(56) References Cited

U.S. PATENT DOCUMENTS

| | | | |
|---|---|---|---|
| 6,366,220 B1 | 4/2002 | Elliott | |
| 8,135,624 B1 * | 3/2012 | Ramalingam | G06Q 30/0205 705/26.1 |
| 8,745,132 B2 | 6/2014 | Obradovich | |
| 8,751,293 B2 | 6/2014 | Hall et al. | |
| 8,818,618 B2 | 8/2014 | Follmer et al. | |
| 9,154,534 B1 | 10/2015 | Gayles et al. | |
| 9,639,907 B2 | 5/2017 | Theobald | |
| 9,893,825 B1 | 2/2018 | Rao et al. | |
| 9,996,861 B2 | 6/2018 | Ryan et al. | |
| 10,032,212 B2 | 7/2018 | Winkelman et al. | |
| 10,235,675 B1 * | 3/2019 | Haverlah | H04L 67/12 |

(Continued)

FOREIGN PATENT DOCUMENTS

| AU | 2019203222 A1 * | 6/2019 | ........... B60R 25/241 |
|---|---|---|---|
| WO | 2011061581 A1 | 5/2011 | |

(Continued)

OTHER PUBLICATIONS

Wallet-on-Wheels—Using Vehicle's Identity for Secure Mobile Money (Year: 2013).*

(Continued)

*Primary Examiner* — Scott C Anderson
*Assistant Examiner* — James H Miller
(74) *Attorney, Agent, or Firm* — Haley Guiliano LLP

(57) ABSTRACT

Methods and systems are employed for completing a transaction via an internet-connected vehicle by leveraging a multi-factor authentication to compare vehicle identification information and user identification information based on stored information. In addition, methods and systems are provided for completing a transaction via an internet-connected vehicle by automatic enforcement of business rules (e.g., parental control spending tools, or employee spending tracking tools).

20 Claims, 15 Drawing Sheets

(56) References Cited

U.S. PATENT DOCUMENTS

| | | | |
|---|---|---|---|
| 10,248,773 B2 | 4/2019 | Wright et al. | |
| 10,306,430 B1 | 5/2019 | Abari et al. | |
| 10,313,714 B2 | 6/2019 | Logan | |
| 10,482,441 B1* | 11/2019 | Watson | G06Q 20/202 |
| 10,504,094 B1* | 12/2019 | Gaudin | G07F 15/001 |
| 10,599,390 B1 | 3/2020 | Brahmbhatt et al. | |
| 10,706,487 B1 | 7/2020 | Chachra et al. | |
| 10,803,440 B1 | 10/2020 | Gaudin et al. | |
| 10,810,572 B1 | 10/2020 | Gaudin et al. | |
| 10,846,313 B2 | 11/2020 | Finnegan et al. | |
| 10,972,206 B1 | 4/2021 | Calvert et al. | |
| 10,992,401 B1 | 4/2021 | Calvert et al. | |
| 10,997,570 B1* | 5/2021 | Kurani | G06Q 20/108 |
| 10,999,416 B1 | 5/2021 | Verma et al. | |
| 11,023,957 B1* | 6/2021 | Montague | H04W 4/023 |
| 11,074,617 B2 | 7/2021 | Patil et al. | |
| 11,107,104 B1 | 8/2021 | Brannan et al. | |
| 11,599,880 B2 | 3/2023 | Calvert et al. | |
| 2005/0024189 A1 | 2/2005 | Weber | |
| 2006/0161599 A1 | 7/2006 | Rosen | |
| 2006/0239501 A1 | 10/2006 | Petrovic et al. | |
| 2007/0039018 A1 | 2/2007 | Saslow et al. | |
| 2008/0092168 A1 | 4/2008 | Logan et al. | |
| 2008/0156173 A1 | 7/2008 | Bauer | |
| 2009/0216433 A1 | 8/2009 | Griesmer et al. | |
| 2010/0082568 A1 | 4/2010 | Lee et al. | |
| 2010/0153008 A1 | 6/2010 | Schwartz et al. | |
| 2010/0280956 A1 | 11/2010 | Chutorash et al. | |
| 2010/0292816 A1 | 11/2010 | Anzures et al. | |
| 2011/0078024 A1 | 3/2011 | Messier et al. | |
| 2011/0093344 A1 | 4/2011 | Burke et al. | |
| 2011/0106375 A1 | 5/2011 | Gurusamy | |
| 2011/0117933 A1* | 5/2011 | Andersson | G01C 21/3688 455/456.2 |
| 2011/0209062 A1 | 8/2011 | Faenger et al. | |
| 2011/0307350 A1 | 12/2011 | Kamimaeda et al. | |
| 2011/0314388 A1 | 12/2011 | Wheatley | |
| 2011/0320021 A1 | 12/2011 | Tahara et al. | |
| 2012/0095819 A1 | 4/2012 | Li | |
| 2012/0209657 A1* | 8/2012 | Connolly | G06Q 20/3224 705/26.7 |
| 2012/0296716 A1 | 11/2012 | Barbeau et al. | |
| 2012/0310713 A1 | 12/2012 | Mercuri et al. | |
| 2013/0085928 A1* | 4/2013 | McKinney | G06Q 20/3278 235/487 |
| 2013/0173419 A1 | 7/2013 | Farber et al. | |
| 2013/0185368 A1 | 7/2013 | Nordstrom et al. | |
| 2013/0191213 A1 | 7/2013 | Beck et al. | |
| 2013/0317944 A1 | 11/2013 | Huang et al. | |
| 2013/0332274 A1 | 12/2013 | Faith et al. | |
| 2014/0045530 A1 | 2/2014 | Gordon et al. | |
| 2014/0188920 A1 | 7/2014 | Sharma et al. | |
| 2014/0240089 A1 | 8/2014 | Chang | |
| 2014/0281971 A1 | 9/2014 | Isbell et al. | |
| 2014/0310060 A1 | 10/2014 | Malsbenden et al. | |
| 2015/0058224 A1 | 2/2015 | Gaddam et al. | |
| 2015/0081157 A1 | 3/2015 | Banasky, et al. | |
| 2015/0120453 A1 | 4/2015 | Lee et al. | |
| 2015/0120509 A1 | 4/2015 | Moring et al. | |
| 2015/0127493 A1* | 5/2015 | Winkelman | G06Q 20/3224 705/26.81 |
| 2015/0154571 A1 | 6/2015 | Zamer | |
| 2015/0161643 A1 | 6/2015 | Randell et al. | |
| 2015/0188967 A1 | 7/2015 | Paulauskas et al. | |
| 2015/0220992 A1 | 8/2015 | Brown et al. | |
| 2015/0234939 A1 | 8/2015 | Aharony et al. | |
| 2015/0254720 A1 | 9/2015 | Newberg et al. | |
| 2015/0269600 A1 | 9/2015 | Randle | |
| 2015/0356665 A1 | 12/2015 | Colson et al. | |
| 2015/0365725 A1 | 12/2015 | Belyaev et al. | |
| 2016/0005003 A1 | 1/2016 | Norris et al. | |
| 2016/0063511 A1 | 3/2016 | Ben-Eliezer et al. | |
| 2016/0088435 A1 | 3/2016 | Weksler et al. | |
| 2016/0098412 A1 | 4/2016 | Davidsson et al. | |
| 2016/0119661 A1 | 4/2016 | Jonnadula et al. | |
| 2016/0162936 A1* | 6/2016 | Khalil | G06Q 30/0261 705/14.52 |
| 2016/0196345 A1 | 7/2016 | Kreifeldt | |
| 2016/0197967 A1 | 7/2016 | Kreifeldt et al. | |
| 2017/0001564 A1 | 1/2017 | Bollea et al. | |
| 2017/0091764 A1* | 3/2017 | Lloyd | G06Q 20/4015 |
| 2017/0113683 A1 | 4/2017 | Mudalige et al. | |
| 2017/0116600 A1* | 4/2017 | Sharan | G06Q 20/3674 |
| 2017/0166221 A1 | 6/2017 | Osterman et al. | |
| 2017/0195166 A1 | 7/2017 | Keerthi et al. | |
| 2017/0197617 A1 | 7/2017 | Penilla et al. | |
| 2017/0255966 A1 | 9/2017 | Khoury | |
| 2017/0278179 A1 | 9/2017 | Perrier et al. | |
| 2017/0289616 A1 | 10/2017 | Igarashi et al. | |
| 2017/0300975 A1 | 10/2017 | Iannace et al. | |
| 2018/0033045 A1 | 2/2018 | Flynn | |
| 2018/0033300 A1 | 2/2018 | Hansen | |
| 2018/0063684 A1 | 3/2018 | Cheng et al. | |
| 2018/0122022 A1* | 5/2018 | Kelly | G06Q 30/0633 |
| 2018/0130095 A1 | 5/2018 | Khoury | |
| 2018/0178737 A1* | 6/2018 | Studnicka | G06Q 20/3224 |
| 2018/0236361 A1 | 8/2018 | Ninoles et al. | |
| 2018/0240169 A1* | 8/2018 | Driscoll | G06Q 30/0633 |
| 2018/0253805 A1* | 9/2018 | Kelly | G06Q 20/385 |
| 2018/0255114 A1 | 9/2018 | Dharmaji | |
| 2018/0275648 A1 | 9/2018 | Ramalingam | |
| 2018/0276674 A1* | 9/2018 | Ramatchandirane | G06Q 20/18 |
| 2018/0285465 A1 | 10/2018 | Schaffernoth et al. | |
| 2018/0308081 A1 | 10/2018 | Kursun et al. | |
| 2018/0336515 A1 | 11/2018 | Mehring et al. | |
| 2018/0350144 A1 | 12/2018 | Rathod | |
| 2018/0374126 A1* | 12/2018 | Patil | B60W 40/08 |
| 2019/0035284 A1 | 1/2019 | Tam | |
| 2019/0196503 A1 | 6/2019 | Abari et al. | |
| 2019/0197514 A1 | 6/2019 | Tineo et al. | |
| 2019/0205951 A1 | 7/2019 | Brock | |
| 2019/0212167 A1 | 7/2019 | Yamada et al. | |
| 2019/0251770 A1* | 8/2019 | Gaddam | G06Q 30/0635 |
| 2019/0306214 A1 | 10/2019 | Drapeau et al. | |
| 2019/0333378 A1 | 10/2019 | Luzifovich et al. | |
| 2019/0337512 A1 | 11/2019 | Tahmasbi-Sarvestani et al. | |
| 2019/0361463 A1 | 11/2019 | Nelson et al. | |
| 2019/0367062 A1 | 12/2019 | Brooks et al. | |
| 2020/0005351 A1 | 1/2020 | Gupta et al. | |
| 2020/0020022 A1 | 1/2020 | Friedman et al. | |
| 2020/0080853 A1 | 3/2020 | Tam et al. | |
| 2020/0104899 A1 | 4/2020 | Banerjee et al. | |
| 2020/0107064 A1 | 4/2020 | Shafai et al. | |
| 2020/0137464 A1 | 4/2020 | Lewis et al. | |
| 2020/0184437 A1 | 6/2020 | Kelly et al. | |
| 2020/0204966 A1 | 6/2020 | Thagadur Shivappa et al. | |
| 2020/0213298 A1* | 7/2020 | Ericson | H04W 12/47 |
| 2020/0258306 A1 | 8/2020 | Forutanpour et al. | |
| 2020/0342379 A1 | 10/2020 | Phillips et al. | |
| 2020/0372488 A1* | 11/2020 | Bhasin | H04W 4/023 |
| 2020/0393259 A1 | 12/2020 | Gantt, et al. | |
| 2021/0044845 A1 | 2/2021 | Bertolami et al. | |
| 2021/0056555 A1* | 2/2021 | Kurylko | G06Q 20/4014 |
| 2021/0241628 A1 | 8/2021 | Otaka et al. | |
| 2021/0281904 A1 | 9/2021 | Calvert et al. | |
| 2021/0295387 A1 | 9/2021 | Calvert et al. | |
| 2021/0297472 A1 | 9/2021 | Calvert et al. | |
| 2021/0311982 A1 | 10/2021 | Kizelshteyn et al. | |
| 2021/0357940 A1* | 11/2021 | Benkreira | G06Q 20/401 |
| 2021/0406893 A1 | 12/2021 | Calvert et al. | |
| 2022/0036396 A1 | 2/2022 | Calvert et al. | |
| 2022/0036397 A1 | 2/2022 | Calvert et al. | |
| 2022/0130247 A1 | 4/2022 | Liu | |

(56) References Cited

U.S. PATENT DOCUMENTS

2022/0300921 A1    9/2022  Book et al.
2022/0366397 A1*  11/2022  Gaudin .............. G06Q 20/3278

FOREIGN PATENT DOCUMENTS

WO    WO-2011061581 A1 *  5/2011    ......... G01C 21/3626
WO    WO 2013132449         9/2013

OTHER PUBLICATIONS

U.S. Appl. No. 16/810,060, filed Mar. 5, 2020, Peter Jason Calvert.
U.S. Appl. No. 16/810,065, filed Mar. 5, 2020, Peter Jason Calvert.
U.S. Appl. No. 16/810,067, filed Mar. 5, 2020, Peter Jason Calvert.
U.S. Appl. No. 16/826,535, filed Mar. 23, 2020, Peter Jason Calvert.
U.S. Appl. No. 16/826,780, filed Mar. 23, 2020, Peter Jason Calvert.
U.S. Appl. No. 16/913,693, filed Jun. 26, 2020, Peter Jason Calvert.
U.S. Appl. No. 16/945,134, filed Jul. 31, 2020, Peter Jason Calvert.
U.S. Appl. No. 16/945,140, filed Jul. 31, 2020, Peter Jason Calvert.

* cited by examiner

SYSTEMS AND METHODS FOR PROVIDING MULTI-FACTOR AUTHENTICATION FOR VEHICLE TRANSACTIONS

BACKGROUND

The present disclosure relates generally to systems and methods for providing multi-factor authentication for vehicle transactions and, more particularly, systems and methods for completing a transaction based on vehicle identification information and user identification information.

SUMMARY

Commonly, to complete a transaction while driving in a vehicle, a user is required to interact with and have contact with a person working at the merchant. For example, the user may be interested in purchasing a meal at a drive-through, and, in completing the transaction required to pay for the meal, the user must come within proximity to a teller to exchange physical currency, credit cards or other forms of payment. This transaction is inconvenient, time-consuming, and inefficient. It slows down the purchase both for the user and for the merchant. Moreover, the transaction may be subject to fraud (e.g., if a stolen credit card is used). Further, the transaction may be dangerous, if for example, socially distancing protocols are required to combat a pandemic (e.g., COVID-19 pandemic). Conventional payments require swiping a physical credit card, scanning a cell phone for QR/barcodes, exchanging of physical money, or tapping watches for payments, but this physical interaction increases the risk of exposure to viruses between individuals (e.g., users and tellers).

In one approach, a vehicle may have an ability to pay for some transactions via an electronic toll-collection system (e.g., radio frequency identification (RFID) unit that transmits radio signals), which includes a transponder that is activated with an antenna as the transponder moves through the path of the antenna. However, such a payment method in a vehicle is not secure and may encourage theft of the vehicle and the ability to rack up major charges without the proper control. For example, an authorized user (e.g., a parent or an employer) permitting someone else, e.g., a child or an employee, to use the vehicle could lead to overspending or purchasing more than the child or employee was given permission to buy. Conventional vehicles do not have the ability to control a transaction. The means of payment may be tied to a physical signal from the vehicle, for example, a radio frequency identification (RFID) unit transmitting basic account information as the vehicle travels through the narrow detection zone of an antenna, typically 6 to 10 feet wide and about 10 feet long near-field monitoring zone, for example, a vehicle driving on a toll road with an MD unit (e.g., E-Z Pass). However, the signal may be difficult to obtain and lead to frustration and delay in completing the transaction. Moreover, there is no way for a conventional vehicle's payment to be controlled or restricted (e.g., by a parent or an employer).

Accordingly, to solve these problems, methods and systems are provided for completing a transaction via an internet-connected vehicle by leveraging a multi-factor authentication to compare vehicle identification information and user identification information based on stored information. For example, when attempting to complete a transaction, the system may use multi-factor verification including vehicle identification information (e.g., VIN, type and color, license plate, etc.) and a user identification information (e.g., biometric marker, facial ID, voice recognition, etc.). Upon receiving a request to complete a transaction, the system will capture the vehicle identification information and user identification information and perform a multi-factor authentication by comparing the captured vehicle identification information and the received user identification information to stored authentication information. Then the matching vehicle identification information and user identification information can be used jointly to authenticate a driver/vehicle pair, allowing the system to complete the transaction.

To achieve this matching of the vehicle identification information and user identification information, a system stores the authentication information. Upon a request to complete a transaction, the system computes a vehicle hash based on capturing vehicle identification information. Further, the system computes a user hash based on receiving user identification information. Based on the hashed information for the vehicle and user, the system compares the computed user hash and the vehicle hash to stored user identification information and stored vehicle identification information. In some embodiments, a suitable computed signature (e.g., checksum, histogram) may be used instead of a hash as authentication information.

In some embodiments, the vehicle identification information may include one or more of the vehicle identification number (VIN), vehicle type, vehicle color, or a vehicle license plate. For example, a vehicle license plate may be used to compute the vehicle hash, which is captured by the system. In some embodiments, the user identification information may include one or more of a biometric marker, a password, a PIN, and/or an ID received from a mobile device of the user. For example, a biometric marker (e.g., a fingerprint recognition, palm veins recognition, face recognition, palmprint recognition, hand geometry recognition, iris recognition, and retina recognition) may be used to compute the user hash. In some embodiments, biometric information can be captured by a device inside the vehicle. In some embodiments, biometric information may be determined by a remote sensor (e.g., a camera).

In some embodiments, the system further includes determining that the user is proximate to the vehicle. To determine that the user is proximate to the vehicle, the system determines a geographical location for the user and a geographic location for the vehicle. In some embodiments, a camera may be used to determine that the user is in proximate location of the vehicle, for example, the GPS coordinates for the vehicle and the GPS coordinates for the user's mobile device may be used to determine the users location. Upon determining the location for each of the user and vehicle, the system determines that the location of the user is within a threshold distance (e.g., 20 feet, 30 feet, 40 feet, 50 feet, etc.) of the location of the vehicle.

Additional advantages, methods and systems are provided for completing a transaction via an internet-connected vehicle by automatic enforcement of business rules (e.g., parental spending control tools, or employee spending tracking tools). For example, to control purchase of products, an authorized user (e.g., a parent or an employer) can provide a policy that includes a user, a vehicle and a rule. For example, an authorized user (e.g., a parent or an employer) can permit a child or occupant of the vehicle to use a vehicle to purchase a coffee from a certain merchant in a certain price range. Further, the authorized user (e.g., a parent or an employer) may include a limit not to exceed for the transaction. For example, the child or occupant of the vehicle can use the vehicle to purchase coffee and other items up to $10. In some embodiments, the rule may include one or more criteria. For example, the rule may include budget criteria, time criteria (e.g., 30 minutes, etc.), merchant criteria (e.g., Dunken Donuts®), or geographical criteria.

To complete the transaction, the authorized user (e.g., a parent or an employer) provides a policy that includes multi-factor authentication to compare permitted vehicle identification and permitted user information. For example, when there is an attempt to complete a transaction, the system may authorize and permit the transaction by use of a multi-factor verification including the vehicle identified as permitted by the policy (e.g., VIN, type and color, license plate, etc.) and the user identified as permitted by the policy (e.g., biometric marker, facial ID, voice recognition, etc.).

In some embodiments, the system further includes determining that the vehicle identified as permitted by the policy and the user identified as permitted by the policy are proximate to the merchant. The system determines that the user and vehicle are proximate to the merchant by determining a geographic location for the user, a geographic location for the vehicle and the geographic location for the merchant, for example, the GPS coordinates for the vehicle and the GPS coordinates for the user's mobile device. Upon determining the locations for each of the user, vehicle and merchant, the system determines that the location of the user and vehicle is within a threshold distance (e.g., 20 feet, 30 feet, 40 feet, 50 feet, etc.) of the location of the merchant.

Upon receiving the information regarding the policy (e.g., user, vehicle, rule) the system uses a multi-factor authentication by comparing the received vehicle identification and the received user identification to metadata stored with the merchant and associated with the user. Then the verified vehicle identification and user identification can be used to authorize or forbid the transaction according to the rule.

In some embodiments, to perform this comparison of vehicle identification and user identification, a system stores metadata associated with the user and vehicle. For example, the system computes a vehicle hash based on capturing vehicle identification. In some embodiments, the system is a car system, a merchant system, or a cloud-based system. Further, the system computes a user hash based on receiving user identification information. Based on the hashed information for the vehicle, user and rule, the system compares the hashed information against the stored metadata for the user and vehicle.

In some embodiments, the vehicle information may include one or more of the vehicle identification number (VIN), vehicle type, vehicle color, or a vehicle license plate. For example, the vehicle license plate may be used to compute the vehicle hash. In some embodiments, the user identification may include one or more of a biometric marker, a password, a pin, an ID received from a mobile device of the user. For example, a biometric marker (e.g., a fingerprint recognition, palm veins recognition, face recognition, palmprint recognition, hand geometry recognition, iris recognition, and retina recognition) may be used to compute the user hash.

Such an improvement to in-vehicle payment systems and interfaces can improve the driving experience of the vehicle's occupants (e.g., complete a transaction with minimal contact with merchant tellers). Further, the system can provide and enforce business rules for vehicle/driver combinations.

BRIEF DESCRIPTION OF THE DRAWINGS

The above and other objects, advantages, and improvements of the disclosure will be apparent upon consideration of the following detailed description, taken in conjunction with the accompanying drawings, in which like reference characters refer to like parts throughout, and in which.

DETAILED DESCRIPTION

The present disclosure is directed to systems and methods for providing multi-factor authentication for vehicle transactions, by completing a transaction based on vehicle identification information and user identification information. In some embodiments, methods and systems are provided for completing a transaction via an internet-connected vehicle by leveraging a multi-factor authentication to compare vehicle identification information and user identification information based on stored information. For example, when attempting to complete a transaction, the system may do so by use of a multi-factor verification including a vehicle identification information (e.g., VIN, type and color, license plate, etc.) and a user identification information (e.g., biometric marker, facial ID recognition, voice recognition, etc.).

Figure 1:
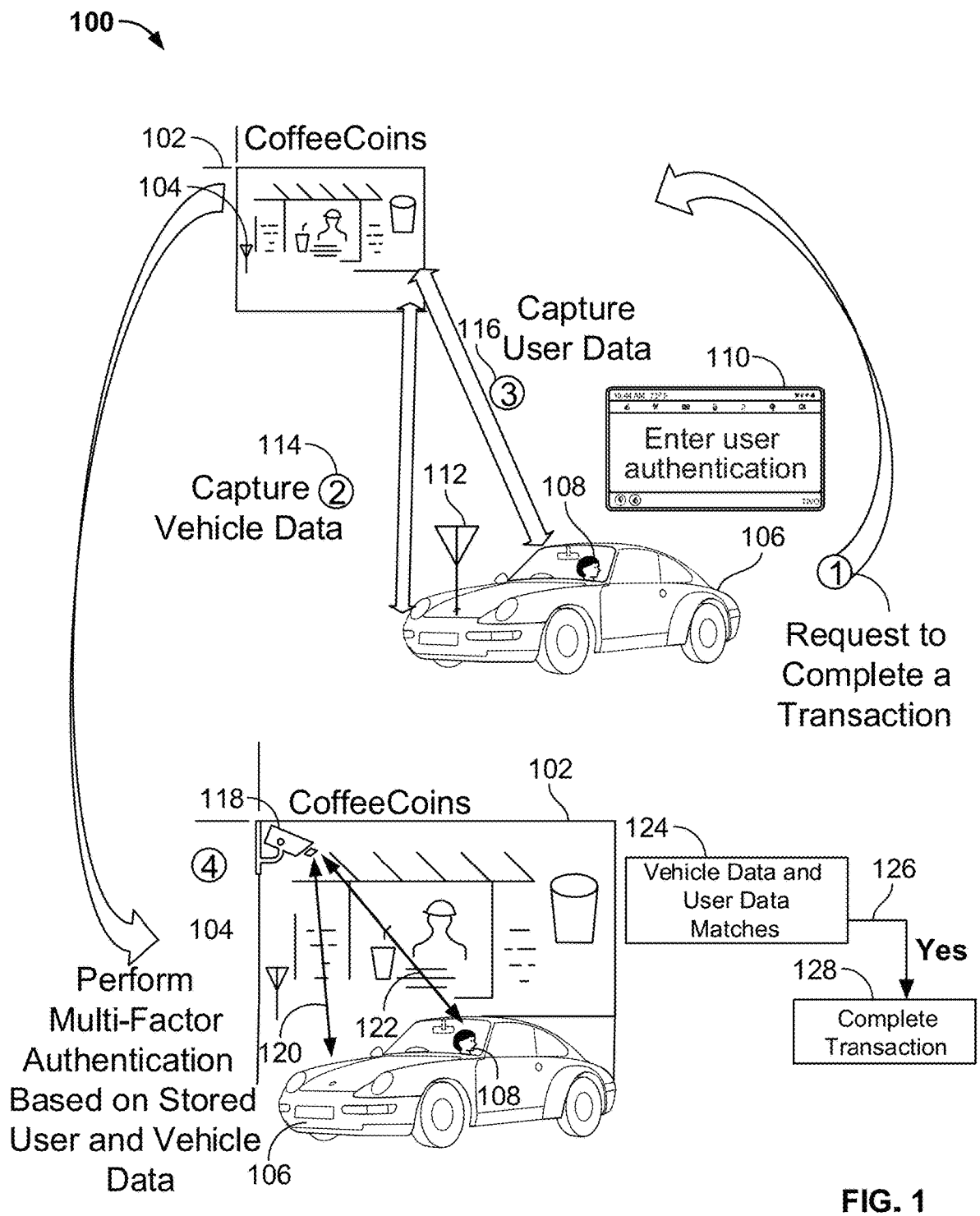
FIG. 1 shows an illustrative example of a scenario for completing a transaction with multi-factor authentication in an internet-connected vehicle, in accordance with some embodiments of the present disclosure.

FIG. 1 shows an illustrative example of a scenario for completing a transaction with multi-factor authentication in an internet-connected vehicle 106, in accordance with some embodiments of the present disclosure. In some embodiments, as shown in FIG. 1, a vehicle 106 having a vehicle antenna 112 and a vehicle interface 110 receives and sends signals (e.g., to complete transactions) from a merchant system 102 (e.g., CoffeeCoins, or any other merchant). The vehicle antenna 112 can receive and send information to and from merchant system 102, or cloud-based servers, to complete a transaction (e.g., transaction to buy a coffee, transaction to buy food, etc.) based on the geographical location of the vehicle and a merchant system's 102 proximity to the vehicle. The vehicle antenna 112 is a receiver and transmitter, and functions to receive or transmit signals. Vehicle antenna 112 can be, e.g., a shark fin antenna array or a flat antenna array formed on a roof of a vehicle. In some embodiments, the vehicle antenna 112 may communicate over a wireless network such as a wireless network that operates according to a 5G specification or standard. In another embodiment, the wireless network includes a wireless network that operates according to a specification or a standard other than a 5G specification or standard. For example, the wireless network may operate as a 3G network, a 4G network, an LTE network, an LTE-Advanced (LTE-A) network, a Global System for Mobile Communications (GSM) network, a Code Division Multiple Access (CDMA) network, a Wideband Code Division Multiple Access (WCDMA) network, an Ultra Mobile Broadband (UMB) network, a High-Speed Packet Access (HSPA) network, an Evolution-Data Optimized (EV-DO) network, a Universal Mobile Telecommunications System (UMTS) network, an Apple Air-Drop, or some other type of wireless network (e.g., an ad hoc network, a non-land-based wireless network, etc.). Vehicle antenna 112 can be coupled to one or more modems to communicate over any number of the above wireless networks.

The merchant system 102 may include a database (not shown) to store all received vehicle ID and user identification information and communicate information with the vehicle in geographical proximity to the merchant system 102 (e.g., via near-field network). This data may be stored in plain text or as hash or signature computed based on vehicle identification information and user identification information. In some embodiments, the data may be acquired upon arrival at the merchant's location. In some embodiments, the data may be entered into a merchant's database during a previous setup. For example, the first time a vehicle and a user visit a merchant, the merchant system 102 may initiate a setup sequence. During the setup, vehicle identification information and user identification information are acquired, hashed, and stored in the database. In the future, this data may be used to authenticate a vehicle and user pair. In some embodiments, vehicle identification information and user identification information are acquired by the merchant system 102 ahead of time (e.g., a user can use a website or an app to pre-send the vehicle identification information and user identification information) and can then be hashed and stored in the merchant's database and used to authenticate the vehicle and a user pair.

The database can be coupled to a server or a collection of servers designed to receive and store the vehicle identification and user identification information and compare the vehicle identification and user identification information as transmitted upon request for a transaction to complete a multi-factor authentication. In some embodiments, the authorized user 108 is in the vehicle 106 providing the user authentication of the multi-factor authentication. In some embodiments, an authorized user 108 provided permission to another user or occupant of the vehicle to enable the user authentication of the multi-factor authentication. In some embodiments, upon arrival of the vehicle 106 near the merchant's system's 102 location, to complete the transaction, item 4 of FIG. 1, the merchant system 102 needs to compare the vehicle identification information and user identification information to stored authentication information. The merchant system 102 may use a camera, or a near-field communication NFC device or an RFID device to search for the vehicle identification information and the user identification information. The transmission of information (e.g., the transaction request, vehicle ID, etc.) between the vehicle and the merchant system 102 can include over-the-air digital signals or over-the-air analog signals. One advantage of this multi-factor authentication is the elimination of handling of credit cards between the user or occupant of the vehicle and the merchant from the merchant system 102. That is, no back and forth handling of credit cards between the user and the merchant employee. In some embodiments, the merchant system 102 may automatically capture the vehicle data (e.g., vehicle identification information) and user data (e.g., user identification data), via a camera 118 with no input from the user, as illustrated in section 4 of the FIG. 1. For example, a camera 118 may be used to capture the information of the vehicle 106 and user 108 or occupant of the vehicle as the vehicle and user approach the merchant system 102. In some embodiments, the user may be prompted, via a merchant system 102 or a vehicle system, to enter a user authentication (e.g., fingerprint, password, pin, etc.).

The system further includes a vehicle 106 with a vehicle antenna array 112 and a vehicle interface 110. In some embodiments, the vehicle is autonomous or semi-autonomous, a vehicle capable of sensing its environment and moving safely with little or no human input. The vehicle may be network-connected, a vehicle that can communicate bi-directionally with other systems outside of the vehicle. The vehicle may communicate bi-directionally via the vehicle antenna array 112 with the merchant system 102 to facilitate and complete the transaction based on the multi-factor authentication. The display 602 in the vehicle 600 may also display audio user interface element 702A, among other user interface elements, which are discussed below with reference to FIG. 7. In one example, when a user or occupant of a vehicle is prompted with a user interface elements 702A on display 602, the vehicle content interface application may display the user interface 602 with options for authorizing a transaction. For example, the user interface 700 may provide a selection of different ways to authenticate the user part of the multi-factor authentication, including prompt facial recognition 710A, fingerprint recognition 706A, voice recognition 708A, password 706B or another way to authenticate to complete the transaction from merchants.

A user or occupant 108 of the vehicle 106 can request to complete a transaction via the vehicle interface, and, in response to user or occupant 108 of the vehicle 106 requesting to complete a transaction, the vehicle antenna 112, via a first network, may transmit the vehicle identification information and user identification information to the merchant system 102 to the merchant antenna 104 associated with the merchant system 102 or a centrally located distribution center associated with the merchant system 102. As the user or occupant 108 of the vehicle 106 approaches the merchant, within a threshold distance (e.g., 25, 100 feet), the merchant may capture vehicle identification information of the vehicle. In some embodiments, the system captures the vehicle identification information 114 via a second network. The system may prompt the user to complete a multi-factor authentication by providing user authentication via user vehicle interface 110, or via merchant interface; request the user to face a camera to complete facial recognition; or request the user to hold a finger up to a camera or scanner for fingerprint verification. Once the user enters or otherwise provides the user authentication, the system captures the user identification information 116.

Upon the vehicle arriving at the location of the merchant, the system may compare 124 the captured vehicle identification information and the user identification information to stored authentication information for the user and vehicle. In some embodiments, the system performing the comparison is an authentication application, which may be included on the vehicle system 1302, on the merchant system 102, on a cloud-based server (e.g., rules server) or on a combination of the systems. For example, the authentication application may the user on a cloud-based server and the vehicle comparison on the merchant system 102. The vehicle may transmit the data identifying the vehicle using a radio frequency (RF) signal. Upon determining that the vehicle identification information and user identification information match the stored authentication information (vehicle data and user data) ("Yes" at 126), at 128, the system completes the transaction. In some embodiments, completing the transaction includes payment of money for merchandise from the merchant. This leads to an improvement in in-vehicle payment systems and interfaces, which can improve the driving experience of the vehicle's occupants.

In a typical interaction of a transaction, as illustrated in Table 1, a transaction between a merchant and a user is completed in approximately 58 seconds. For example, a typical transaction may include the steps of: user drives up to a merchant, merchant employee requests a card, user opens a window, user hands over a credit card, employee runs a card, and employee returns card and a receipt. Such typical interaction of the transaction may take approximately 58 seconds based on the above listed actions and the associated time to complete each respective action, as summarized in Table 1.

| Actions | Time |
| --- | --- |
| User drives up to a merchant | 10 seconds |
| Merchant employee requests a card | 5 seconds |
| User opens a window | 3 seconds |
| User hands over a credit card | 5 seconds |
| Employee runs a card | 30 seconds |
| Employee returns card and a receipt | 5 seconds |
| Total | 58 seconds |

Table 1, A list of actions and time required to complete each action for a transaction in a typical interaction between a merchant and a user.

In a vehicle/user authentication as described in some embodiments, an interaction of a transaction between a merchant and a user in a vehicle is completed much faster than a typical transaction. For example, the interaction between the merchant and the user in a vehicle may include the steps of: user drives up to a merchant, vehicle identification information is captured (e.g., by camera), user identification information is provided (e.g., fingerprint using internal sensor), hashing of the vehicle and user data, and authentication is performed. Such interaction of a transaction between a merchant and a user in a vehicle may take approximately 15 seconds based on the above listed actions and the associated time to complete each respective action, as summarized in Table 2. By employing the multi-factor authentication, a transaction between a merchant and user in a vehicle is completed much faster than the typical transaction. In some embodiments, the steps may be complete in even faster, by capturing the user identification information automatically, via a camera, and avoiding the time required to perform the step of user entering user authentication.

| Actions | Time |
| --- | --- |
| User drives up to a store | 10 seconds |
| Car Information Captured (e.g., by camera) | Negligible (milliseconds) |
| User provides information (e.g., fingerprint using internal sensor) | 5 seconds |
| Hashing and Authentication preformed | Negligible (milliseconds) |
| Total | 15 seconds |

Table 2, A list of necessary actions and time required to complete a transaction in a vehicle/user authentication interaction.

In some embodiments, the transaction is not a monetary transaction but rather a safety-oriented service, e.g., picking up children from daycare to avoid contamination in the waiting area at the school. In some embodiments, the user (e.g., parent) may receive a note from a child's school for pickup, and to prevent contamination, may arrive at the school, wait in the parking lot and provide authentication information (e.g., both vehicles-based data and user-based data), which may permit the school personnel to authenticate the parent and allow the child to leave the school. In some embodiments, an authorized user 108 may provide permission to another user to complete errands, e.g., pick up dry cleaning or children from school.

In some embodiments, the transaction is requested by the authorized user 108. In other embodiments, the transaction is the product of receiving an offer in a vehicle and providing acceptance of the offer by the authorized user 108. Upon acceptance of the offer for e.g., a free upgrade, the vehicle may transmit vehicle information and user information to the merchant as part of a multi-factor authentication method.

In some embodiments, merchant transaction is initiated based on the geographical location of the vehicle and the proximity to the merchant. The system identifies a geographical location of the vehicle and a geographical location of a merchant (which may be a known value stored in a database) when requesting to complete a transaction. The system determines, based on the geographical location of the vehicle (e.g., determined by GPS, cell signal triangulation etc.) and the proximity of the vehicle to the merchant, to request a transaction. When the geographical location of the vehicle is within range of the merchant associated with the merchant system 102, the system provides an offer to the vehicle. Upon the request of the transaction by the user or occupant of the vehicle, the vehicle transmits data (vehicle data and user data) from the vehicle to the merchant system 102, and upon arriving near the merchant system 102, the vehicle transmits second data (second data identifying the vehicle) from the vehicle to the merchant system 102.

In some embodiments, methods and systems are provided for completing a transaction via an internet-connected vehicle by automatic enforcement of business rules (e.g., parental control spending tools, or employee spending tracking tools). For example, when attempting to purchase a product, an authorized user 108 (e.g., a parent or an employer) can provide a policy that includes a user, a vehicle and a rule. For example, an authorized user 108 (e.g., a parent or an employer) can permit a child or occupant of the vehicle to use a vehicle to purchase a coffee from a certain merchant in a certain price range. Further, the authorized user 108 (e.g., a parent or an employer) may include a limit not to exceed for the transaction.

Figure 2:
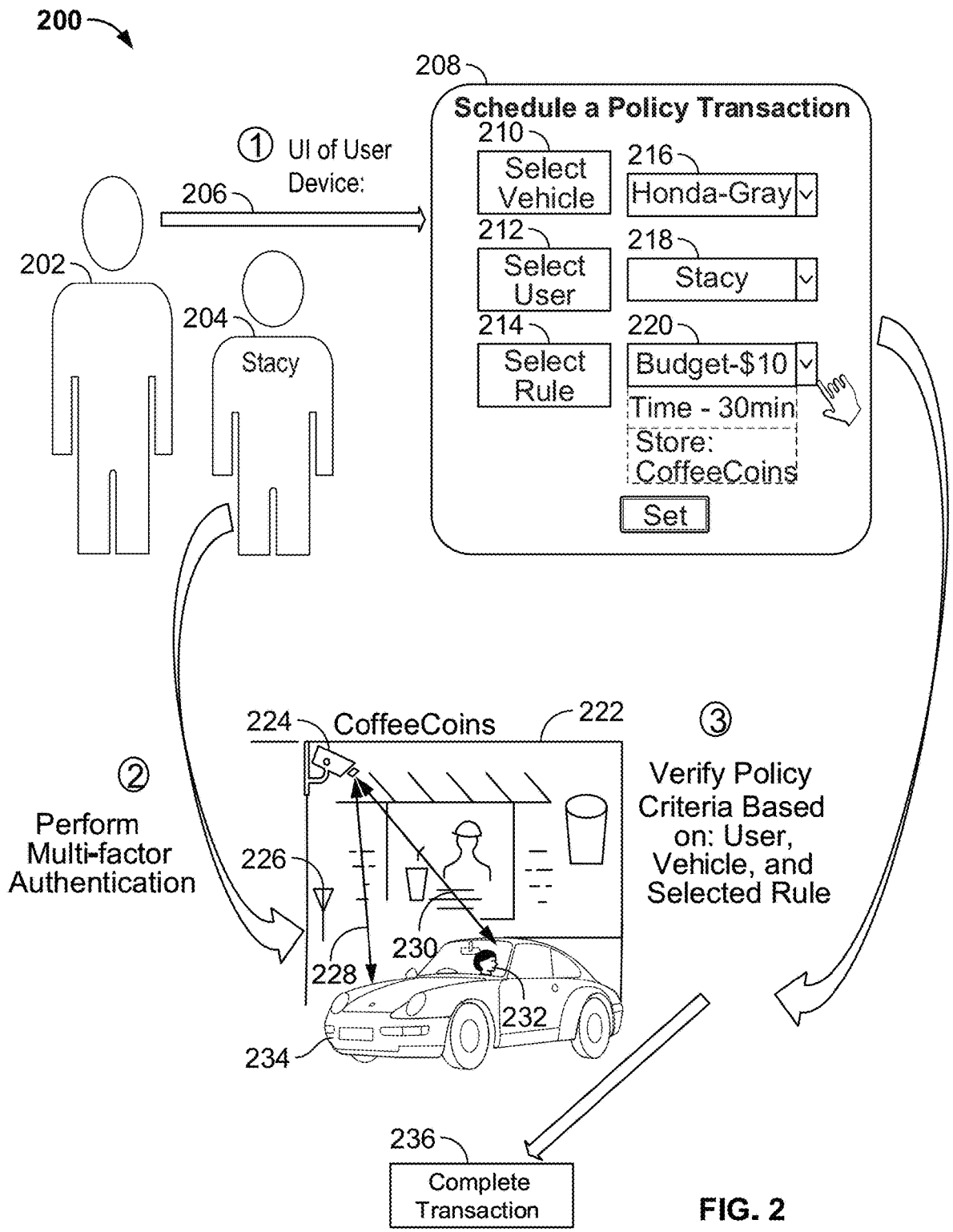
FIG. 2 depicts an illustrative example of a scenario for completing a transaction with multi-factor authentication after receiving permission in an internet-connected vehicle, in accordance with some embodiments of the present disclosure.

FIG. 2 depicts an illustrative example of a scenario for completing a transaction with multi-factor authentication based on a vehicle/user business rule, in accordance with some embodiments of the present disclosure. In some embodiments, as shown in FIG. 2, an authorized user 202 provides a policy 206 via a mobile device 208. The policy can include a selection for a vehicle 210, a user 212 and a rule 214 that is to be applied to complete a transaction. The device interface (e.g., a mobile device interface) may include prepopulated options (216, 218, 220) for each one of the selected categories (user, vehicle, rule). In some embodiments, the options may be manually entered for each category. Upon a policy being set by the authorized user 202, the policy is received by the authentication application. The system receives permission from the policy for a user 204, a vehicle and a rule to complete a transaction. While the user 204 is in a vehicle 234, the system performs multi-factor authentication (e.g., as described with respect to FIG. 1), while also verifying that the rule is satisfied before permitting the transaction to proceed. For example, as vehicle 234 arrives at the merchant, the merchant's system camera 224 monitors for vehicles 228, and monitors for users 230 to verify that they match the policy provided for the transaction to be complete. The policy verification system further verifies that the rule is satisfied, for example, the budget is not exceeded, the time limit is applied, the merchant is approved. In some embodiments, the policy is automatic enforcement of business rules (e.g., parental spending control tools, or employee spending tracking tools). For example, when attempting to purchase a product, an authorized user (e.g., a parent or an employer) can provide a policy that includes a user, a vehicle and a rule. In some embodiments, the rule is specific to the user/vehicle pair.

In some embodiments, the user identification information that is received by the merchant is hashed. In some embodiments, the vehicle identification information that is received by the merchant is hashed. Generating any one of vehicle identification and user identification information may be performed by a variety of other techniques disclosed herein. In some embodiments, the user identification information and/or vehicle identification information may be a hash value generated by the hash technique. The hash technique may be based on a cryptographic algorithm or other suitable mathematical algorithms for generating a hash code. For example, values of the action attributes and the mappings (e.g., alphanumeric values) may be converted to data that is further converted into a hash value via the hash function utilizing the hash code.

Figure 3:
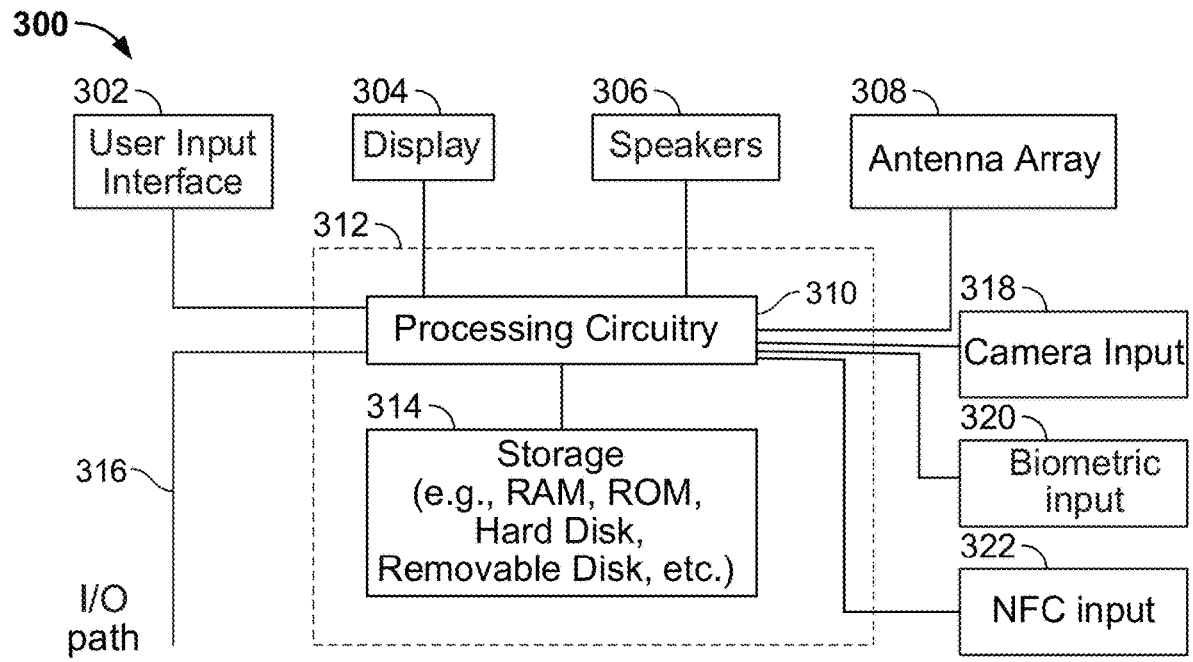
FIG. 3 depicts a block diagram of an illustrative example of a user equipment device, in accordance with some embodiments of the present disclosure.

A user or occupant in a vehicle or authorized user 108 of the vehicle may access content from the vehicle content interface application (and its display screens described above and below) or from one or more of their user equipment devices. FIG. 3 shows a generalized embodiment of illustrative user equipment device 300. More specific implementations of user equipment devices are discussed below in connection with FIG. 4. User equipment device 300 may receive content and may provide data via input/output (hereinafter "I/O") path 316. I/O path 316 may provide offers and request a transaction over a local area network (LAN) or wide area network (WAN) and data to control circuitry 312, which includes processing circuitry 310 and storage 314. Control circuitry 312 may be used to send and receive commands, requests, and other suitable data using I/O path 316 or camera inputs 318, biometric inputs 320 and near-field communication (NFC) inputs 322.

Control circuitry 312 may be based on any suitable processing circuitry such as processing circuitry 310. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc. It may include a multi-core processor (e.g., dual-core, quadcore, hexa-core, or any suitable number of cores) or supercomputer. In some embodiments, processing circuitry may be distributed across multiple separate processors or processing units. In some embodiments, control circuitry 312 executes instructions for a vehicle content interface application stored in memory (i.e., storage 314). Specifically, control circuitry 312 may be instructed by the vehicle content interface application to perform the functions discussed above and below. For example, the vehicle content interface application may provide instructions to control circuitry 312 to complete a transaction. In some implementations, any action performed by control circuitry 312 may be based on instructions received from the vehicle content interface application. In some embodiments, the instructions when executed by the server perform the "authentication application" as described above and below.

In client/server-based embodiments, control circuitry 312 may include communications circuitry suitable for communicating with a merchant system server or other networks or servers. The instructions for carrying out the above-mentioned functionality may be stored on the vehicle memory, or merchant system server. Communications circuitry may include a cable modem, an integrated-services digital network (ISDN) modem, a digital subscriber line (DSL) modem, a telephone modem, an Ethernet card, a wireless modem for communication with other equipment, or any other suitable communications circuitry. Such communications may be one or more networks including the internet, a mobile phone network, mobile voice or data network (e.g., a 5G, 4G or LTE network), mesh network, peer-to-peer network, cable network, or other type of communications network or combinations of communications networks. Paths may separately or together include one or more communications paths, such as a satellite path, a fiber-optic path, a cable path, a path that supports internet communications, free-space connections (e.g., for broadcast or other wireless signals), or any other suitable wired or wireless communications path or combination of such paths. In some embodiments, an antenna 308 is provided in the user equipment device 300. The antenna array 308 may be used for communication with the network of antennas. In addition, communications circuitry may include circuitry that enables peer-to-peer communication of user equipment devices or communication of user equipment devices in locations remote from each other (described in more detail below).

Memory may be an electronic storage device provided as storage 314 that is part of control circuitry 312. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Storage 314 may be used to store various types of content described herein as well as content data and content application data that are described above. Nonvolatile memory may also be used (e.g., to launch a boot-up routine and other instructions). Cloud-based storage may be used to supplement storage 314 or instead of storage 314.

Control circuitry 312 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 312 may also include scaler circuitry for upconverting and down-converting content into the preferred output format of the user equipment device 300. Control circuitry 312 may also include digital-to-analog converter circuitry and analog-to-digital converter circuitry for converting between digital and analog signals. The tuning and encoding circuitry may be used by the user equipment device to receive and to display, to play, or to record content. In some embodiments, the user equipment device 300, via the control circuitry, may include an HD antenna.

In some embodiments, speakers 306 may be provided as integrated with other elements of user equipment device 300 or may be stand-alone units. The audio and other content, may provide offers from merchants or requests to complete transactions displayed on display 304, may be complete through speakers 306 and a user input interface 302. In some embodiments, the user part of the multi-factor authentication may be completed using a camera input 318, a biometric input 320 or NFC input, or a combination thereof. In some embodiments, the transactions may be completed using the camera input 318, to scan for the user or occupant of the vehicle, to confirm the user is in the vehicle. In some embodiments, the transactions may be completed using the biometric input 320, to complete multi-factor authentication for the user or occupant of the vehicle. Biometric input 320 may include a fingerprint, palm veins, face recognition, palmprint, hand geometry, iris recognition, and retina. The biometric input may be located in the vehicle as part of the vehicle user interface, in the user's mobile device, in the merchant's system via a portal, a combination of both, or in all of the systems. In some embodiments, the transactions may be completed using the near-field communication input 322, to complete multi-factor authentication for the user or occupant of the vehicle.

In some embodiments, a sensor (not shown) is provided in the user equipment device 300. The sensor may be used to monitor, identify, and determine vehicular data. For example, the vehicle content interface application may receive vehicular speed data from the sensor or any other status data (e.g., global positioning data of the vehicle, driving condition of the vehicle, etc.) received from any other vehicular circuitry and/or component that describes the vehicular status of the vehicle.

The vehicle content interface application may be implemented using any suitable architecture. For example, it may be a stand-alone application wholly implemented on user equipment device 300. In such an approach, instructions for the application are stored locally (e.g., in storage 314), and data for use by the application is downloaded on a periodic basis (e.g., from an out-of-band feed, from an Internet resource, or using another suitable approach). Control circuitry 312 may retrieve instructions for the application from storage 314 and process the instructions to generate any of the displays discussed herein. Based on the processed instructions, control circuitry 312 may determine what action to perform when input is received from user input interface 302. For example, the movement of a cursor on an audio user interface element may be indicated by the processed instructions when user input interface 302 indicates that user interface 900A or 900B was selected.

In some embodiments, the vehicle content interface application is a client/server-based application. Data for use by a thick or thin client implemented on user equipment device 300 is retrieved on demand by issuing requests to a server remote from the user equipment device 300. In one example of a client/server-based content application, control circuitry 312 runs a web browser that interprets web pages provided by a remote server. For example, the remote server may store the instructions for the application in a storage device. The remote server may process the stored instructions using circuitry (e.g., control circuitry 312) and generate the displays discussed above and below. The client device may receive the displays generated by the remote server and may display the content of the displays locally on user equipment device 300. This way, the processing of the instructions is performed remotely by the server while the resulting displays are provided locally on user equipment device 300. User equipment device 300 may receive inputs from the user or occupant of the vehicle via user input interface 302 and transmit those inputs to the remote server for processing and generating the corresponding displays. For example, user equipment device 300 may transmit, via antenna array 308, communication to the remote server, indicating that a user interface element was selected via user input interface 302. The remote server may process instructions in accordance with that input and generate a display of content identifiers associated with the selected user interface element, as described in greater detail with reference to FIGS. 7A, 7B, 8, 9A and 9B. The generated display is then transmitted to a user equipment device 300 for presentation to the user or occupant of the vehicle.

In some embodiments, the vehicle content interface application is downloaded and interpreted or otherwise run by an interpreter or virtual machine (run by control circuitry 312). In some embodiments, the vehicle content interface application may be encoded in the ETV Binary Interchange Format (EBIF), received by control circuitry 312 as part of a suitable feed, and interpreted by a user agent running on control circuitry 312. For example, the vehicle content interface application may be an EBIF application. In some embodiments, the vehicle content interface application may be defined by a series of JAVA-based files that are received and run by a local virtual machine or other suitable middleware executed by control circuitry 312. In some embodiments (e.g., those employing MPEG-2 or other digital media encoding schemes), the vehicle content interface application may be, for example, encoded and transmitted in an MPEG2 object carousel with the MPEG audio of a program.

Figure 4:
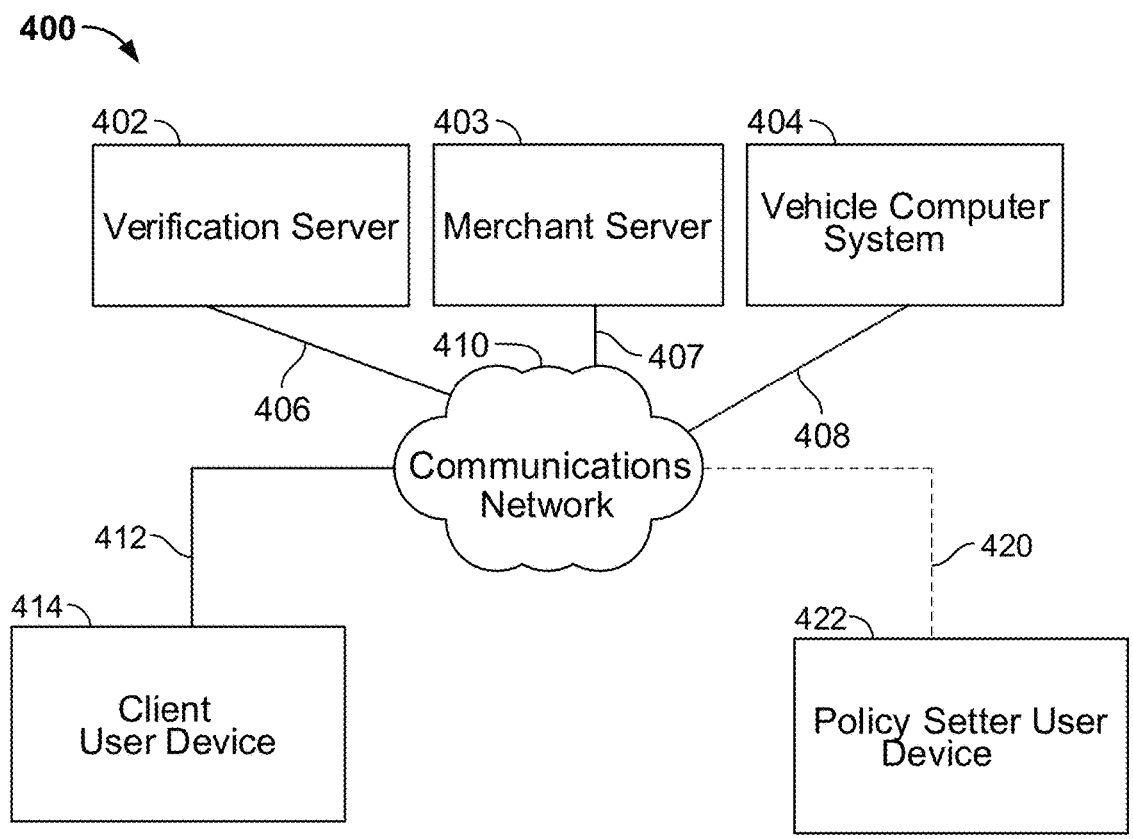
FIG. 4 depicts a block diagram of an illustrative example implementing the user equipment device, in accordance with some embodiments of the present disclosure.

FIG. 4 depicts an example of an illustrative system 400 implementing the user equipment device 300 of FIG. 3 as client user device 414, policy setter user device 422, or any other type of user equipment suitable for accessing content. For simplicity, these devices may be referred to herein collectively as user equipment or user equipment devices and may be substantially similar to user equipment devices described above. User equipment devices, on which a vehicle content interface application may be implemented, may function as stand-alone devices or may be part of a network of devices. Various network configurations of devices may be implemented and are discussed in more detail below.

A user equipment device utilizing at least some of the system features described above in connection with FIG. 3 may not be classified solely as client user device 414, and policy setter user device 422. For example, client user device 414 and policy setter user device 422 may be Internet-enabled, allowing for access to internet content, allowing for access to receiving multi-factor authentication to complete a transaction. The vehicle content interface application may have the same layout on various types of user equipment or may be tailored to the display capabilities of the user equipment. For example, on client user device 414, the vehicle content interface application may be provided as a website accessed by a web browser. In another example, the vehicle content interface application may be scaled down for policy setter user device 422.

The user equipment devices may be coupled to communications network 410. Communications network 410 may be one or more networks, including the Internet, a mobile phone network, mobile voice or data network (e.g., a 4G, 5G or LTE network), cable network, public switched telephone network or other type of communications network or combinations of communications networks.

System 400 includes verification server 402, a merchant server 403 and vehicle computer system 404 coupled to communications network 410. Communications with the verification server 402, a merchant server 403 and vehicle computer system 404 may be exchanged over one or more communications paths but are shown as a single path in FIG. 4 to avoid overcomplicating the drawing. Although communications between verification server 402, a merchant server 403 and vehicle computer system 404 with client user devices 414 and 422 are shown as through communications network 410, in some embodiments, verification server 402, a merchant server 403 and vehicle computer system 404 may communicate directly 412 and 420 with client user devices 414 and 422.

Verification server 402 may include one or more types of servers distributed in the user system, merchant system 102, or a cloud-based system used to verify the multi-factor authentication. Merchant server 403 may be located at a merchant's location, or cloud-based storage to store vehicle identification information, and user information. The stored information may be hashed to protect the identity of the user. Vehicle computer system 404 may be located in the vehicle or in cloud-based storage to store vehicle identification information, and user information. The stored information may be hashed to protect the identity of the user. Vehicle content interface application data may be provided to the user equipment devices using any suitable approach. In some embodiments, vehicle content interface application data from verification server 402 may be provided to user equipment using a client/server approach. For example, a user equipment device may perform the verification from a server, or a server may complete the verification of the vehicle identification information and user identification information. Verification server 402 may provide to user equipment devices 414 and 422 the vehicle content interface application itself or software updates for the vehicle content interface application.

Figure 5:
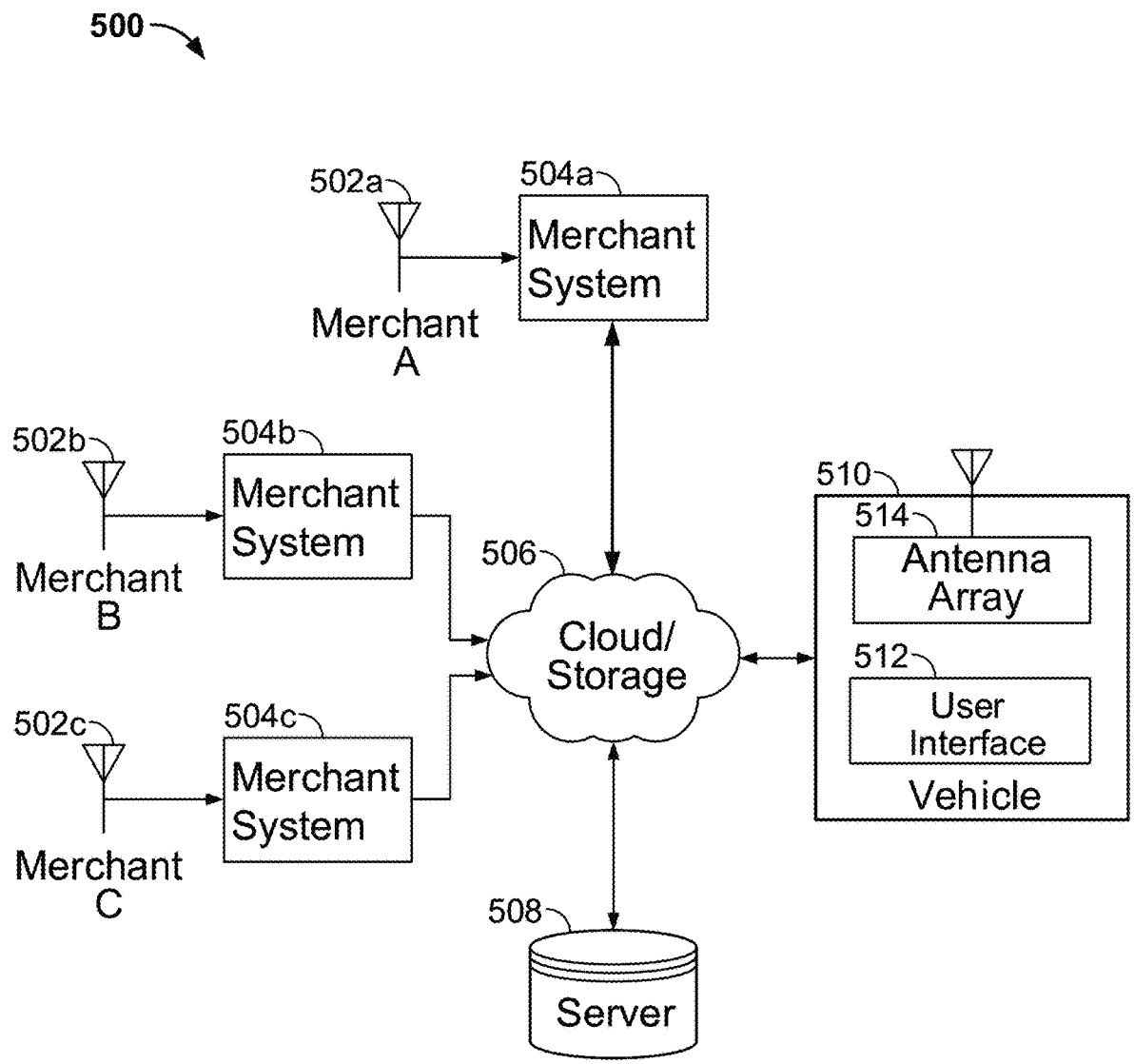
FIG. 5 depicts a block diagram of an illustrative system of a merchant system, in accordance with some embodiments of the present disclosure.

FIG. 5 depicts a block diagram of an illustrative example of a merchant system 500 in which user equipment device 300 of FIG. 3 and the system 400 of FIG. 4 can be implemented. System 500 includes an array of antennas (e.g., 502a, 502b, 502c . . . 502n) associated with a merchant and connected to merchant systems (e.g., 504a, 504b, 504c . . . 504n) coupled to storage 506, server 508 and a vehicle 510. The vehicle 510 can communicate bidirectionally with other systems outside of the vehicle. Communications with an array of antennas (e.g., 502a, 502b, 502c . . . 502n) associated with merchants and connected to merchant systems (e.g., 504a, 504b, 504c . . . 504n) and storage 506 may be exchanged over one or more communications paths but are shown as a single path in FIG. 5 to avoid overcomplicating the drawing.

The array of antennas (e.g., 502a, 502b, 502c . . . 502n) associated with merchants may include a plurality of antennas dispersed at each merchant location and coupled to receive and transmit data associated with multi-factor authentication to complete a transaction. The antennas may be coupled to merchant systems (e.g., 504a, 504b, 504c . . . 504n) that collect all of the data associated with vehicle identification and user identification and deliver it to the storage 506. In some embodiment, each of the merchant systems (e.g., 504a, 504b, 504c . . . 504n) can receive a policy, where the policy includes a combination of vehicle and user permitted to complete a transaction at that merchant. The storage 506 is connected to the server 508 for processing for recognition vehicle identification and user identification and geographical location determination. The merchant transactions are processed through an automated content recognition. The automated content recognition can store, allocate based on content recognition and process for completion of the transaction between the user and merchant on the user interface of the vehicle. The server 508 may be a collection of servers connected to the storage device for improved processing. The vehicle includes a user interface 512 and a vehicle antenna 514 that communicates with the storage 506. All of the communication between the antennas, merchant systems, servers and vehicle may be through one or more networks including the internet, a mobile phone network, mobile voice or data network (e.g., a 4G, 5G or LTE network), or other type of communications network or combinations of communications networks for in-vehicle use.

Figure 6:
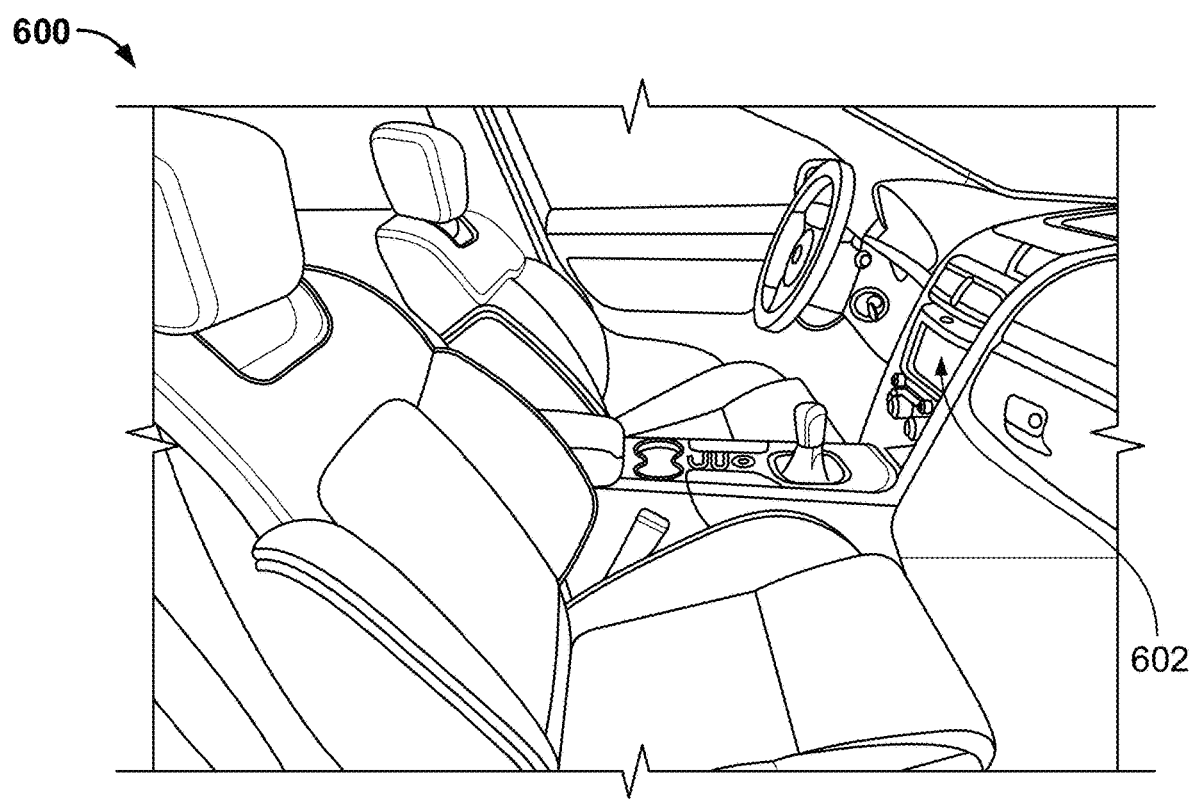
FIG. 6 depicts an illustrative example of a vehicle featuring a content display, in accordance with some embodiments of the present disclosure.

FIG. 6 depicts an illustrative example of a vehicle featuring a content display, in accordance with some embodiments of the present disclosure. In some embodiments, the user equipment device may refer to components incorporated into, coupled to, or accessible by a vehicle, such as vehicle 600 in FIG. 6. The vehicle 600 is equipped with a vehicle content interface application that may be used to enable/disable content options. For example, a user or occupant in a vehicle 600 may use vehicle content interface component 602 to access content in vehicle 600. In some embodiments, the vehicle content interface component 602 may be an audio system incorporated into vehicle 600 or user equipment used to access such content while using vehicle 600.

Figure 7A:
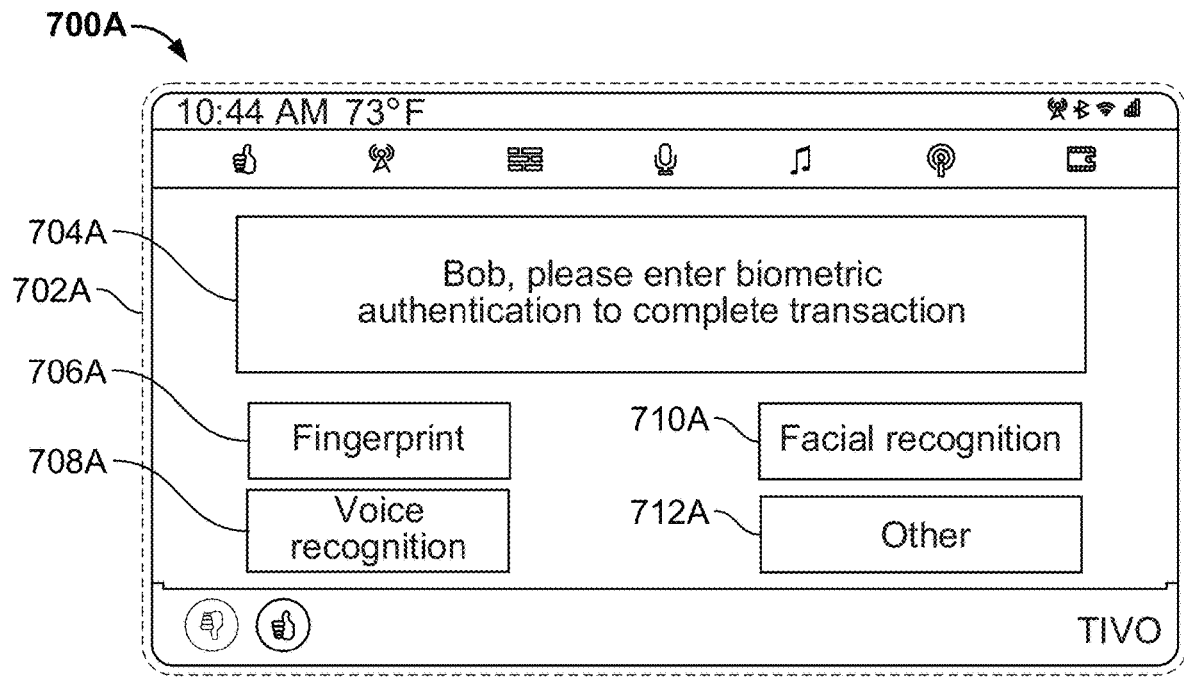
FIGS. 7A and 7B depict illustrative examples of a vehicle content interface application for displaying user authentication in a vehicle, in accordance with some embodiments of the present disclosure.
Figure 7B:
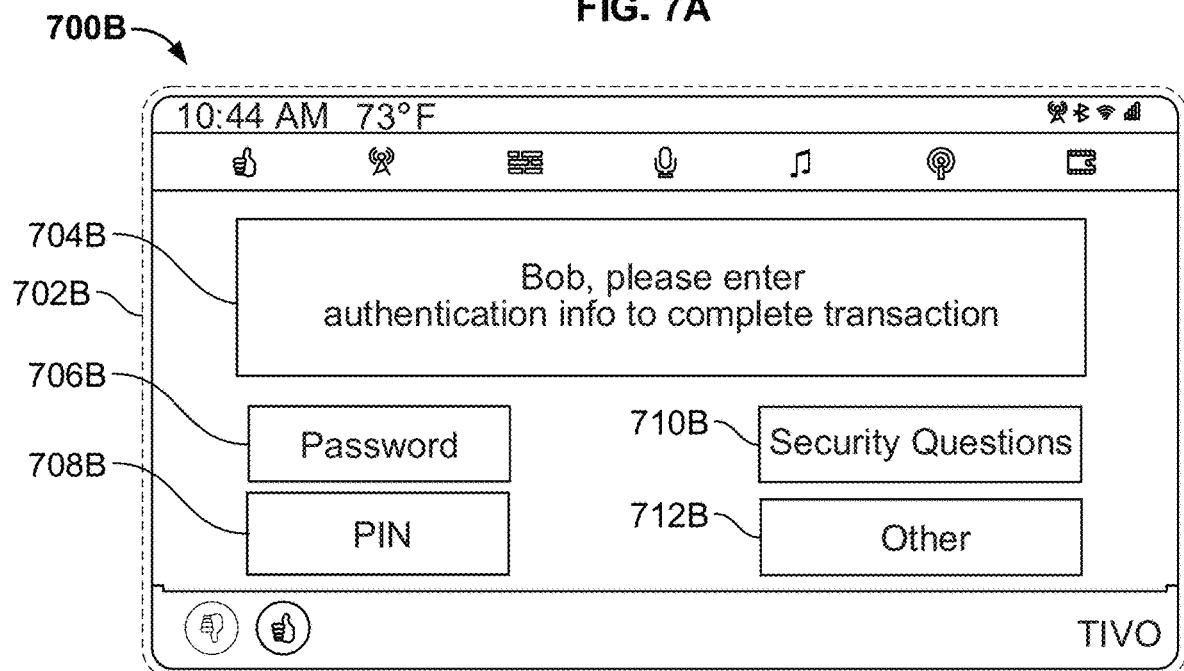

FIGS. 7A and 7B depict illustrative examples of a vehicle content interface application for displaying user authentication, in accordance with some embodiments of the present disclosure. FIG. 7A shows, upon a request to complete a transaction, a prompt for the user device with a user's selection for user authentication 704A, for example, "Bob, please enter biometric authentication to complete transaction." A list of user authentication options 706A, 708A, 710A and 712A are displayed on the display screen 702A, as shown in FIG. 7A. For example, the user may use the option for fingerprint 706A, voice recognition 708A, facial recognition 710A or other 712A to complete the multi-factor authentication. When the user selects one of the authentications via the user interface (e.g., user input interface 700A incorporated into or accompanying the vehicle content interface component 702A, the authentication option corresponding to the selected option is displayed on the screen. For example, when the user selects the fingerprint option 706A, the vehicle content interface component 702A prompts the user to enter a fingerprint. In another example, when the user selects the voice recognition option 708A, the vehicle content interface component 702A prompts the user with a voice recognition option, which is confirmed via speakers 306, and a microphone (not shown). In yet another example, when the user selects the facial recognition option 710A, the vehicle content interface component 702A prompts the user with a facial recognition option, which is confirmed via camera input 318.

In some embodiments, to complete a transaction, the merchant system performs the authentication application on the user automatically, without user input. For example, the merchant can perform the authentication using a camera that scans the user's face and, upon determining that the scanned face of the user matches the stored data associated with the user, the merchant can proceed with the transaction.

FIG. 7B shows, upon a request to complete a transaction, a prompt for the user device with a user's selection for user authentication 704B, for example, "Bob, please enter authentication info to complete transaction." A list of user authentication options 706B, 708B, 710B and 712B are displayed on the display screen 702B, as shown in FIG. 7B. For example, the user may use option for password 706B, PIN 708B, security question 710B or other 712B to complete the authentication of the user. When the user selects one of the authentications via the user interface (e.g., user input interface 700B incorporated into or accompanying the vehicle content interface component 702B, the authentication option corresponding to the selected option is displayed on the screen. For example, when the user selects the password option 706B, the vehicle content interface component 702B prompts the user to enter a password. In some embodiments, the password is entered on a user input interface 302 on the display of the vehicle or the user's mobile device. The password is transmitted to the merchant, where it is hashed for the security of the user. In another example, when the user selects the PIN option 708B, the vehicle content interface component 702B prompts the user with a PIN option, which is confirmed via user input interface 302. In yet another example, when the user selects the security question option 710B, the vehicle content interface component 702B may prompt the user to answer a security question option, which is confirmed via user input interface 302. The answer to the security question is transmitted to the merchant's system, where it is hashed for the security of the user.

Figure 8:
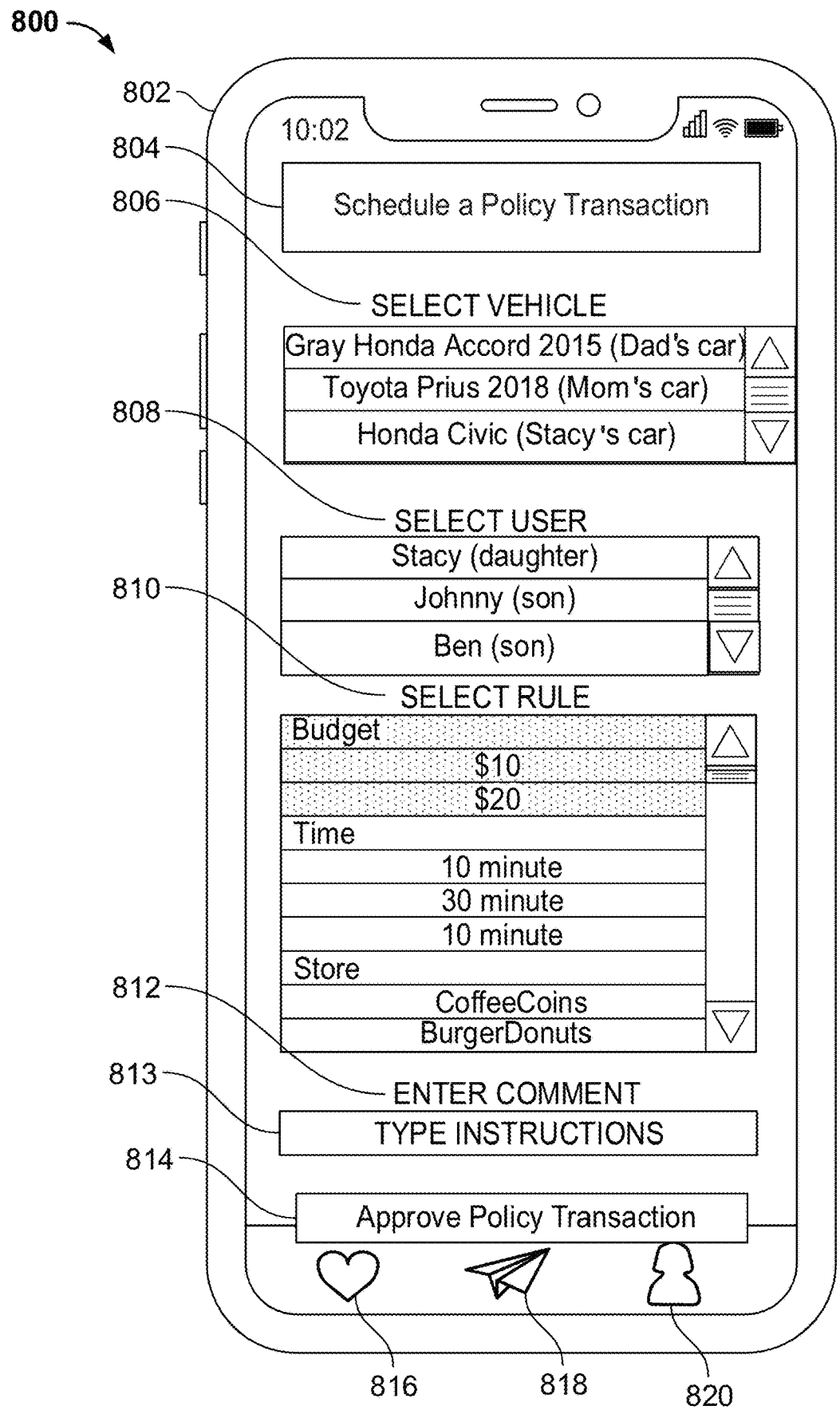
FIG. 8 shows a face view of a user device with an option to schedule a policy transaction, in accordance with some embodiments of the present disclosure.

FIG. 8 shows a face view of an authorized user device with an option to schedule a policy transaction, in accordance with some embodiments of the present disclosure. The authorized user's device 800 includes illustrative device display 802 for inputting the desired policy. Device 800 may include a smartphone or other suitable user device configured to receive and send a policy inputted by an authorized user (e.g., parent, employer). As illustrated, device display 802 shows an option for selecting a vehicle 806 from a list of potential vehicles, and the list may be accessed from storage in the database or manually entered. The device further shows an option for selecting a user 808 from a list of potential users, and the list may be accessed from storage in the database or manually entered. In some embodiments, the device further includes options for a rule 810 from a list of potential limitations, for example, budget, time, merchant, or location, or a combination thereof. For example, the authorized user may set a rule limiting the number of merchants available for the transaction, or selecting specific merchants where the transaction may be completed. Further, the device includes text entry region 812, with icons 816-820, for indicating user instructions in navigating the displayed software application.

Text entry region 812 may include a displayed cursor and may display text inputted by a user. For example, the user may provide haptic interaction to the screen of device 800 by touching displayed keys of a displayed keyboard. In a further example, a user may enter a message to text entry region 812. Icon 813 corresponds to inserting text into text entry region 812. For example, when a user selects icon 813 (e.g., touching the region of the screen corresponding to icon 813), a touchscreen keyboard may be displayed.

List of vehicles 806 includes a list of vehicles preloaded into the system with authentication.

List of potential users 808, as illustrated, includes a list of users that are in a vehicle to whom the authorized user may wish to provide authorization to pay for a transaction using the vehicle. For example, a list of potential users 808 may include a contacts list, coworkers and family members stored in the memory of device 800. A list of potential users 808, as illustrated, includes a vertical list with a scroll bar for navigating the list.

List of rules 810 may include one or more criteria that need to be satisfied before the transaction can be authorized. For example, the authorized user may enter a limit of $10 per coffee, or $20 for lunch. In another example, the authorized user may require a time limit, for example, allowing the selected user to obtain a coffee within 10 minutes, or 20 minutes. In yet another example, the authorized user may select an option for a merchant (e.g., CoffeeCoins, BurgerDonut).

Soft button 814 may be selected by an authorized user (e.g., by touching the region of the screen corresponding to soft button 814) to approve a policy transaction. Icons 816, 818, and 820 may be used to navigate the policy transaction application displayed. For example, as illustrated, icon 818 indicates a "send message" screen (e.g., currently displayed).

Figure 9A:
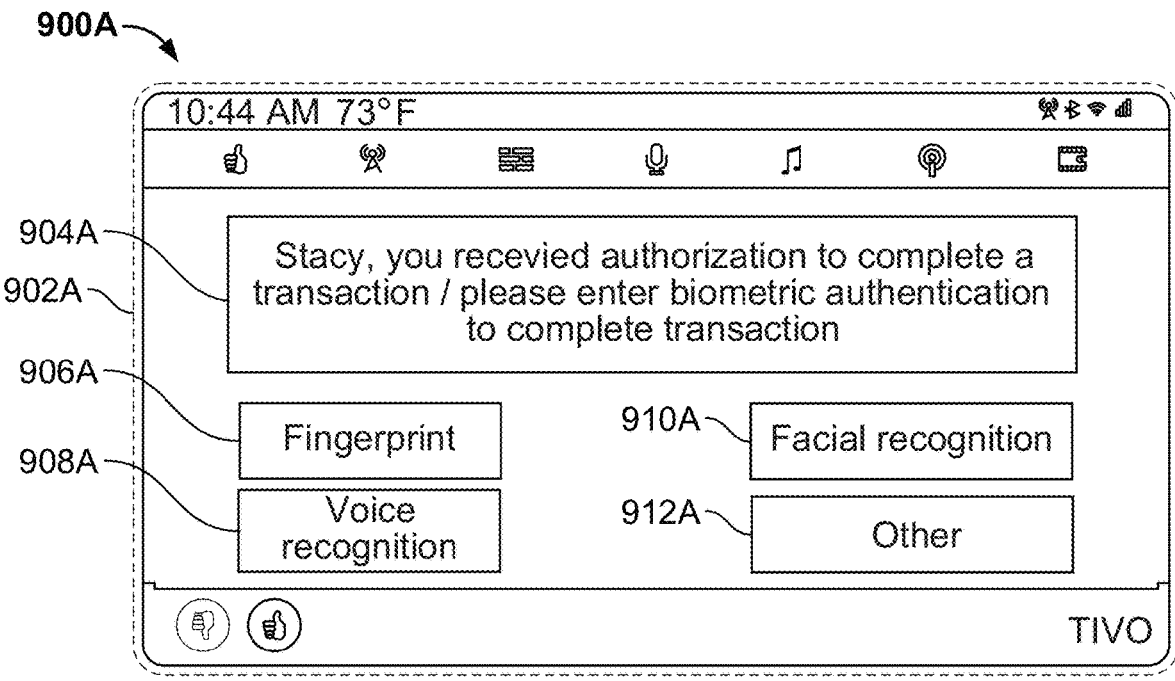
FIGS. 9A and 9B depict illustrative examples of a vehicle content interface application for displaying user authentication in a vehicle after receiving permission for a transaction, in accordance with some embodiments of the present disclosure.
Figure 9B:
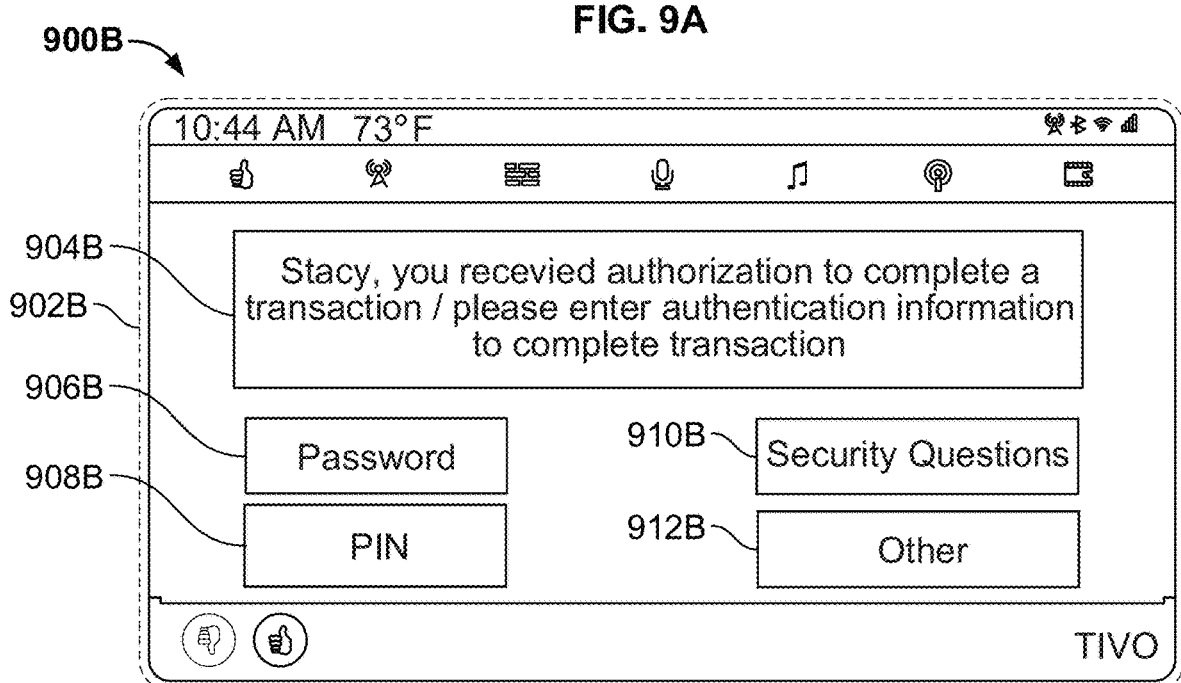

FIGS. 9A and 9B depict illustrative examples of a vehicle content interface application for displaying user authentication after receiving permission, in accordance with some embodiments of the present disclosure. FIG. 9A shows, after receiving permission to complete a transaction from an authorized user, a prompt appears on the user's device with a user's selection for user authentication 904A, for example, "Stacy, you received authorization to complete a transaction—please enter biometric authentication to complete transaction." In some embodiments, the authentication options may be presented on the merchant's terminal or on user's interface 302 on a display. A list of user authentications options 906A, 908A, 910A and 912A are displayed on the display screen 902A, as shown in FIG. 9A. For example, the user may use the option for fingerprint 906A, voice recognition 908A, facial recognition 910A or other 912A to complete the multi-factor authentication. When the user selects one of the authentications via the user interface (e.g., user input interface 900A incorporated into or accompanying the vehicle content interface component 902A, the authentication option corresponding to the selected option is displayed on the screen. For example, when the user selects the fingerprint option 906A, the vehicle content interface component 902A prompts the user to enter a fingerprint. In another example, when the user selects the voice recognition option 908A, the vehicle content interface component 902A prompts the user with a voice recognition option, which is confirmed via speakers 306, and a microphone (not shown). In yet another example, when the user selects the facial recognition option 910A, the vehicle content interface component 902A prompts the user with a facial recognition option, which is confirmed via camera input 318.

FIG. 9B shows, after receiving permission to complete a transaction from an authorized user, a prompt appears on the user device with a user's selection for user authentication 904B, for example, "Stacy, you received authorization to complete a transaction—please enter biometric authentication to complete transaction." A list of user authentications options 906B, 908B, 910B and 912B are displayed on the display screen 902B, as shown in FIG. 9B. For example, the user may use the option for password 906B, PIN 908B, security question 910B or other 912B to complete the authentication of the user. When the user selects one of the authentications via the user interface (e.g., user input interface 900B (FIG. 9B) incorporated into or accompanying the vehicle content interface component 902B, the authentication option corresponding to the selected option is displayed on the screen. For example, when the user selects the password option 906B, the vehicle content interface component 902B prompts the user to enter a password. In another example, when the user selects the option PIN 908B, the vehicle content interface component 902B prompts the user with a PIN option, which is confirmed via user input interface 302. In yet another example, when the user selects the security question option 910B, the vehicle content interface component 902B may prompt the user to answer a security question option, which is confirmed via user input interface 302. The answer to the security question is transmitted to the merchant's system, where it is hashed for the security of the user.

Figure 10:
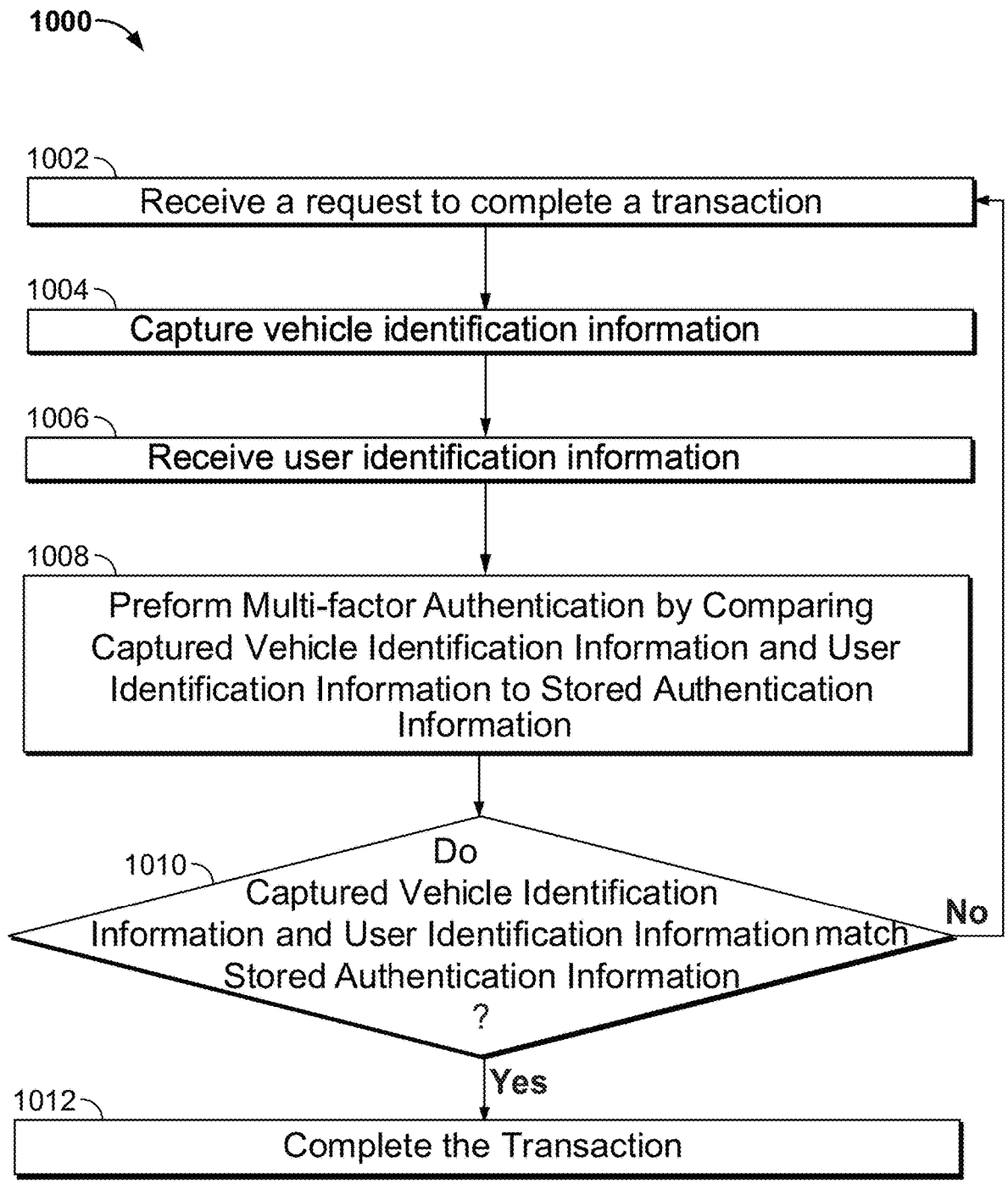
FIG. 10 is a flowchart of an illustrative process for completing a transaction with multi-factor authentication in an internet-connected vehicle, in accordance with some embodiments of the present disclosure.

FIG. 10 is a flowchart of an illustrative process 1000 for completing a transaction with multi-factor authentication in an internet-connected vehicle, in accordance with some embodiments of the present disclosure. As shown in FIG. 10, in accordance with some embodiments, a process 1000 may be executed by processing circuitry of user equipment device 300 (FIG. 3). It should be noted that process 1000 or any step thereof could be performed on, or provided by, the system of FIGS. 3 and 4 or any of the devices shown in FIGS. 1, 2, and 6-9. In addition, one or more of processes 1000 may be incorporated into or combined with one or more other steps described herein (e.g., incorporated into steps of processes 1100 and 1200). For example, process 1000 may be executed by control circuitry 312 (FIG. 3) as instructed by a vehicle content interface application implemented on a user device to provide an offer to a vehicle based on vehicle identification and geographical location. In addition, one or more steps of process 1000 may be incorporated into or combined with one or more steps of any other process or embodiment. At 1002, the control circuitry receives a request to complete a transaction. The control circuitry may be at the merchant, at a vehicle, at a cloud-based server or any other suitable location for receiving the requests for transaction. The request for a transaction may be scheduled in advance or based on accepting an offer from a merchant. For example, the system may receive from a user input (e.g., via user interface 602 (FIG. 6)) a request for completing a transaction.

At 1004, the control circuitry captures vehicle identification information. For example, the control circuitry captures either the vehicle identification number, vehicle type, vehicle color, or a vehicle license plate or a combination thereof.

At 1006, the control circuitry receives user identification information from the authorized user. For example, the user identification may be selected from one of a biometric marker, a password, a PIN, or an ID received from a mobile device of the user.

At 1008, control circuitry performs multi-factor authentication by comparing the captured vehicle identification information and received user identification information to stored authentication information. For example, the merchant system includes a database of stored vehicle identifications and user identifications, and compares the information captured and received with a request to complete the transaction.

At 1010, the control circuitry determines if the captured vehicle identification information and received user identification information match the stored authentication information. If the control circuitry determines that the information captured and received match the stored authentication information ("Yes" at 1010), then, at 1012, control circuitry completes the transaction. In some embodiments, the data may be presented as a first combination of data transmitted by the vehicle via a first network to the merchant system 102. The first combination includes vehicle identification information and user identification information. If, on the other hand, the control circuitry determines that the information captured and received does not match the stored authentication information ("No" at 1010), then 1002 may be repeated. The process for completing the transaction in a vehicle based on vehicle identification information and user identification information may include processing a plurality of transactions from a plurality of merchants associated with a variety of merchant systems 102. In some embodiments, a merchant may transmit several offers to the vehicle for the user or occupant to choose from and in response to acceptance, the user may request a specific transaction. In some embodiments, a user may request to complete a transaction.

In some embodiments, in response to transmitting information identifying the vehicle at 1004 and the user at 1006, the control circuitry determines that the vehicle and user are proximate to the merchant, the control circuitry transmits authorization over a near-field communication.

Figure 11:
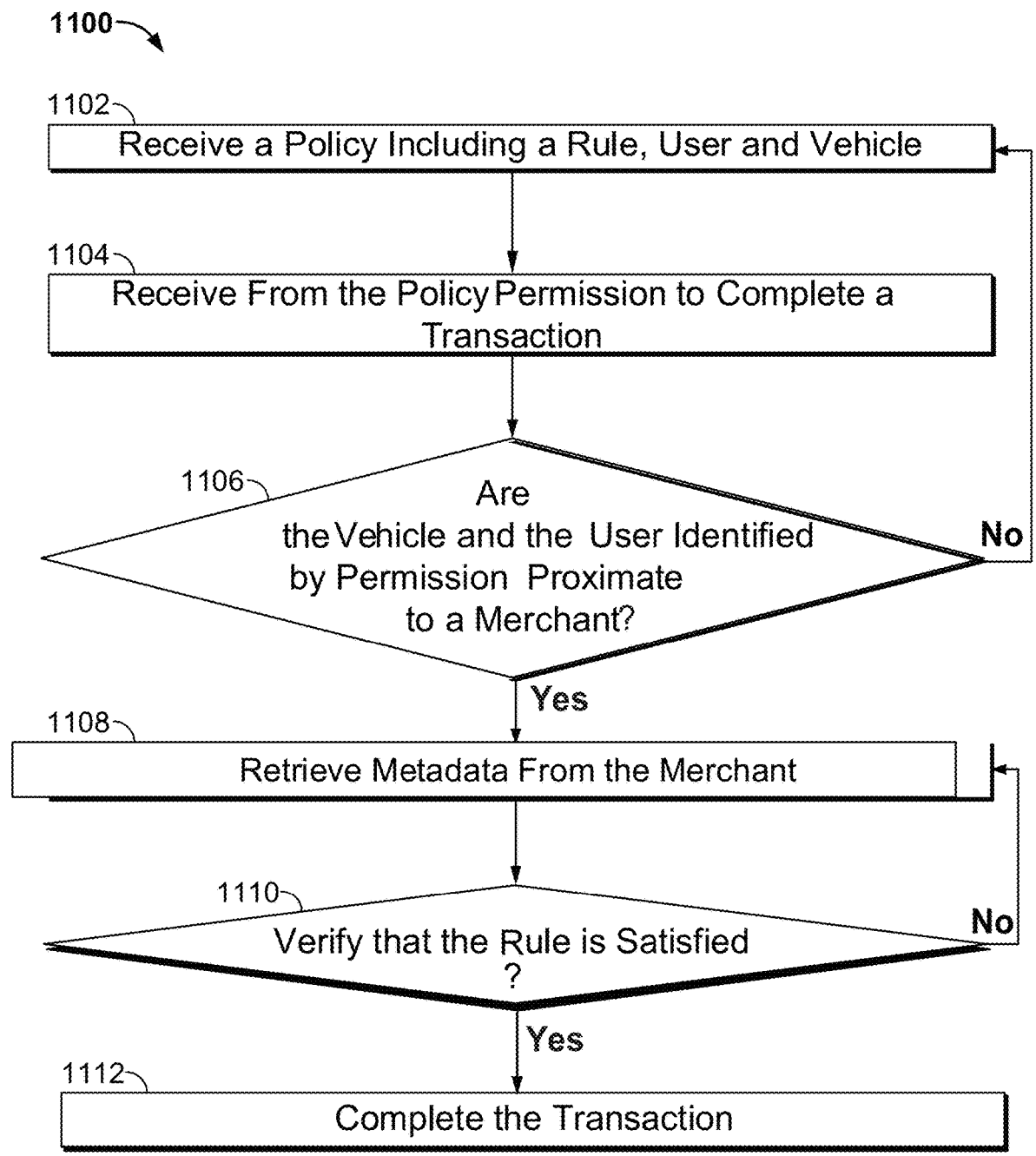
FIG. 11 is a flowchart of an illustrative process for completing a transaction with multi-factor authentication after receiving permission in an internet-connected vehicle for a transaction, in accordance with some embodiments of the present disclosure.

FIG. 11 is a flowchart of an illustrative process 1100 for completing a transaction with multi-factor authentication after receiving permission in an internet-connected vehicle, in accordance with some embodiments of the present disclosure. As shown in FIG. 11, in accordance with some embodiments, a process 1100 may be executed by processing circuitry of vehicle 300 (FIG. 3). It should be noted that process 1100 or any step thereof could be performed on, or provided by, the system of FIGS. 3 and 4 or any of the devices shown in FIGS. 1, 2, and 6-9. In addition, one or more of processes 1100 may be incorporated into or combined with one or more other steps described herein (e.g., incorporated into steps of processes 1000 and 1200). For example, process 1100 may be executed by control circuitry 312 (FIG. 3) as instructed by a vehicle content interface application implemented on a user device in order to provide an offer to a vehicle based on vehicle identification and geographical location. In some embodiments, process 1100 may be executed by a policy enforcement system, which receives a policy and verifies that all the criteria are satisfied. Also, one or more steps of process 1100 may be incorporated into or combined with one or more steps of any other process or embodiment.

At 1102, the policy enforcement system receives a policy for completing a transaction, including a rule, a user and a vehicle. The policy enforcement system may be at the merchant, at a vehicle, at a cloud-based server or any other suitable location for receiving a policy for completing a transaction. An authorized user, i.e., a user who has the authority to complete the transaction provides the policy. With the policy, the authorized user provides permission to another user, for example, a child, a coworker, or an employee to use the purchasing power. The rule may be criteria required, for example, budget, time restriction, merchant restriction, or other criteria to complete the policy. The budget may include a limit on the amount a user may spend with the permitted transaction. The merchant restriction may be a restriction on some merchants, for example, only purchase from a CoffeeCoins. The policy may be a one-time transaction (e.g., permission to purchase coffee), a monthly time limit (e.g., budget of $500 for the month of June), or some other time criteria. In some embodiments, for example, the system may receive from a user input device (e.g., via user device 800 (FIG. 8)) a request for completing a transaction by providing permission to a vehicle, a user and criteria.

At 1104, the policy enforcement system receives from the user the request to complete the transaction. The request may provide permission to a vehicle, a user and criteria.

At 1106, the policy enforcement system determines that a vehicle and a user identified in the policy as permitted are proximate to a merchant. The system may determine the location of each of the users or occupants of the vehicle to determine that the user or occupant is in proximity to the merchant. If the policy enforcement system determines that the vehicle and the user identified by permission in the policy are proximate to a merchant ("Yes" at 1106), then, at 1108, the policy enforcement system retrieves metadata from the merchant, for example, the name of the merchant, the type of business (e.g., fast food, coffee, etc.). The system may determine the location of each of the users or occupants of the vehicle to determine that they are in proximity to the merchant. If, on the other hand, the policy enforcement system determines that the vehicle and the user identified by permission in the policy are not proximate to the merchant ("No" at 1106), then 1102 may be repeated.

At 1110, the policy enforcement system continues by verifying that the rule, for example, the rule provided in 1102 as part of the policy, is satisfied. If the rule requires that a budget does not exceed a specific value, the policy enforcement system evaluates the transaction to see if the cost of the merchandise is higher than the specific value. In another example, the rule requires that a specific merchant (CoffeeCoins) is approved, the policy enforcement system determines the rule is satisfied by confirming that the merchant is approved for the transaction, and may allow the transaction to proceed. If the policy enforcement system verifies that the rule is satisfied ("Yes" at 1110), then, at 1112, the policy enforcement system completes the transaction. If, on the other hand, the policy enforcement system determines that the rule is not satisfied ("No" at 1110), then 1108 may be repeated.

Figure 12:
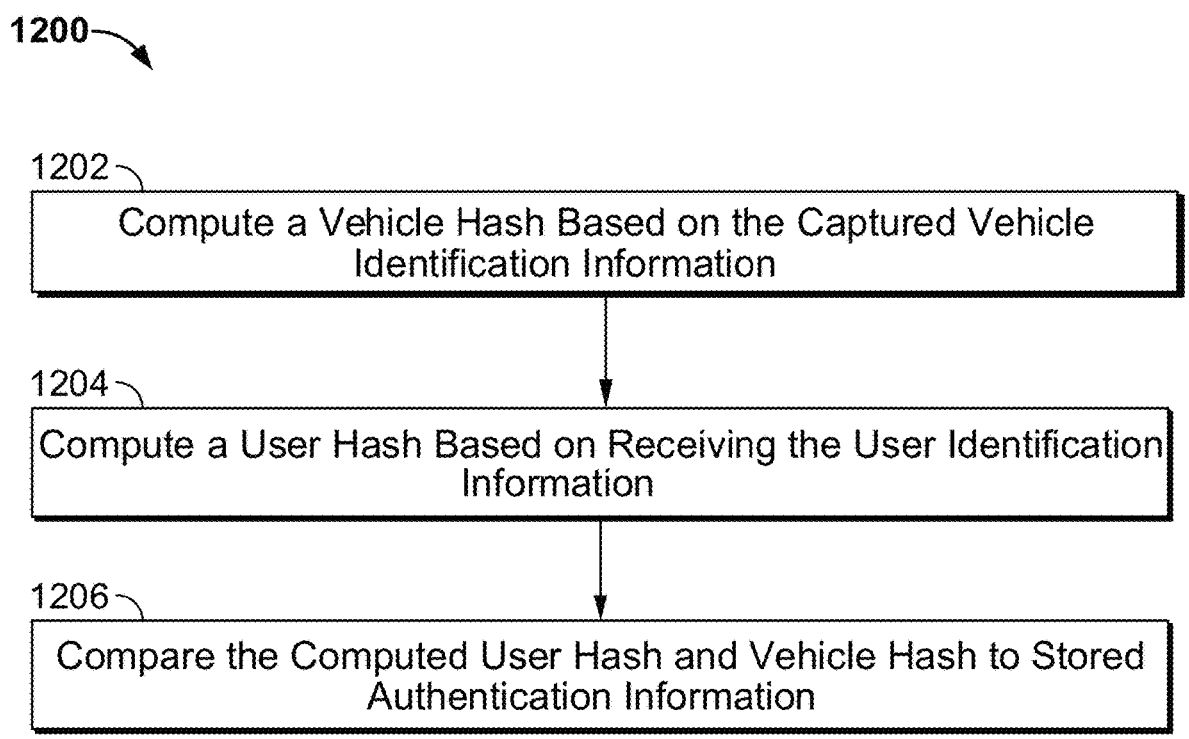
FIG. 12 depicts an example of an illustrative flowchart of the process of hashing the vehicle and user information, in accordance with some embodiments of the present disclosure.

FIG. 12 depicts an example of an illustrative flowchart of the process of hashing the vehicle and user information, in accordance with some embodiments of the present disclosure. As shown in FIG. 12, in accordance with some embodiments, a process 1200 may be executed by processing circuitry of vehicle 300 (FIG. 3). It should be noted that process 1200 or any step thereof could be performed on, or provided by, the system of FIGS. 3 and 4 or any of the devices shown in FIGS. 1, 2, and 6-9. In addition, one or more of processes 1200 may be incorporated into or combined with one or more other steps described herein (e.g., incorporated into steps of processes 1000 and 1100). For example, process 1200 may be executed by control circuitry 312 (FIG. 3) as instructed by a vehicle content interface application implemented on a user device, in order to provide an offer to a vehicle based on vehicle identification and geographical location. In some embodiments, process 1200 may be executed by a policy enforcement system, which receives a policy and verifies that all the criteria are satisfied. Also, one or more steps of process 1200 may be incorporated into or combined with one or more steps of any other process or embodiment.

At 1202, the control circuitry computes a vehicle hash based on the captured vehicle identification information. For example, the vehicle arrives at the merchant's location, and the system captures one or more data about the vehicle, such as vehicle identification number, vehicle license plate number, vehicle type, and/or color, and computes a hash based on the capture information.

At 1204, the control circuitry computes a user hash based on the received user identification information. For example, the vehicle arrives at the merchant's location, and the system receives one or more data about the user, such as a biometric marker, a password, a PIN, and/or an ID received from a mobile device of the user.

At 1206, the control circuitry compares the computed user hash and vehicle hash to the stored authentication information.

Figure 13:
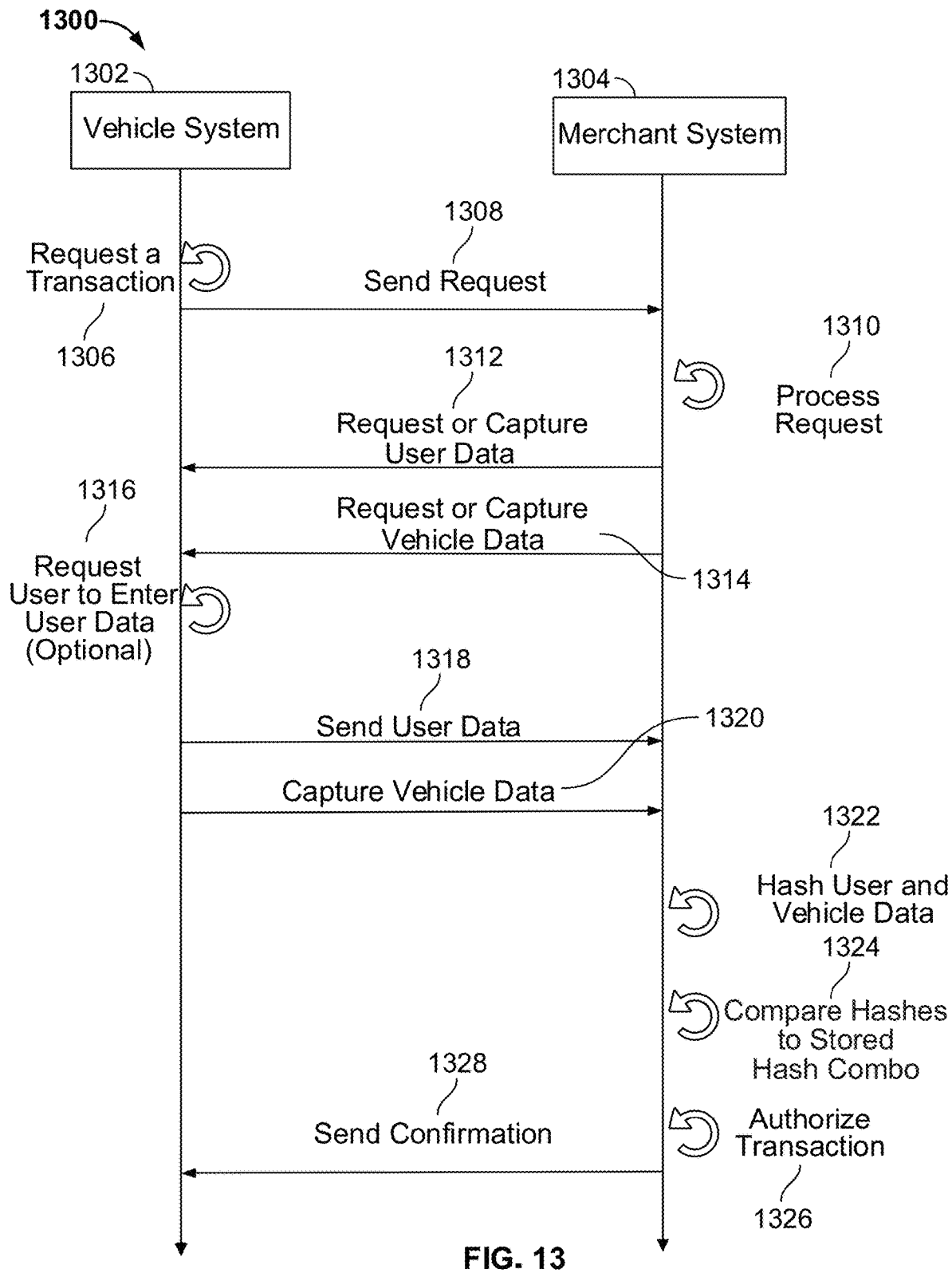
FIG. 13 is a flowchart of a detailed illustrative process for completing a transaction with a device associated with a vehicle and a device associated with a merchant, in accordance with some embodiments of the present disclosure.

FIG. 13 shows a processing flow 1300 for completing a transaction with a vehicle system 1302 associated with a vehicle and a merchant system 1304 associated with a merchant, in accordance with some embodiments of this present disclosure. It should be noted that process 1300 or any step thereof could be performed on, or provided by, the system of FIGS. 3 and 4 or any of the devices shown in FIGS. 1, 2, and 6-9. In some embodiments, the steps of process 1300 are performed as described in discussion of FIG. 1. For example, process 1300 may be executed by devices 402, 403, 404, 414 or 422 (e.g., via control circuitry 312) and/or control circuitry of the vehicle system, as instructed by an authentication application that may be implemented on vehicle system 1302, and/or merchant system 1304, such as to distribute control of database management application operations for a target device among multiple devices. In addition, one or more steps of process 1300 may be incorporated into or combined with one or more steps of any other process or embodiment (e.g., process 1100 of FIG. 11, process 1200 of FIG. 12, process 1400 of FIG. 14, process 1500 of FIG. 15 or process 1600 of FIG. 16).

At 1306, the control circuitry of a vehicle system 1302 (e.g., user interface of vehicle 106 of FIG. 1) may request a transaction via a communication network (e.g., communication network 410 of FIG. 4). The transaction may be associated with a vehicle, a user and a merchant.

At 1308, the vehicle device sends the request to a merchant system 1304 via a communication network (e.g., communication network 410 of FIG. 4), and, at 1310, the merchant system 1304 processes the request. For example, the merchant system will evaluate the transaction, confirm that the merchant can fulfill the transaction, and schedule the transaction for completion.

At 1312, the control circuitry of the merchant system requests or captures the user data associated with the transaction. For example, the merchant system may request user data for authentication. The user may provide the user data via a vehicle interface, or via a merchant portal. At 1314, the control circuitry of the merchant system requests or captures vehicle data associated with the transaction. For example, the merchant data requests the vehicle data for authentication. The merchant system may capture the vehicle's information as the vehicle approaches the merchant, via a communication network (e.g., merchant may request that car identify itself via near-field network, for example, by providing its VIN) or a camera that can distinguish vehicle make, color, and/or license plate. The steps of 1312 and 1314 may be performed in sequence, simultaneously or in reverse order.

At 1316, the control circuitry of the merchant system may requests the user to enter user data, and/or the vehicle system may optionally prompt the user to enter user data to authenticate the transaction. The prompt for the user to enter user data may be options presented to the user, or in some embodiments, the vehicle system may automatically capture the user's data. For example, a camera may be used to capture the user's image and identify the user using facial recognition. In another example, a voice recognition software may listen to the user over the microphone of the vehicle to identify the user. In some embodiments, the user may provide a PIN or password via vehicle's interface or via merchant terminal.

At 1318, the control circuitry of the vehicle system may send the user data to the merchant system, and, at 1320, the control circuitry of the vehicle system may send the user data to the merchant system. The steps of 1318 and 1320 may be performed in sequence or simultaneously or in reverse order. In some embodiments, instead of the data being sent in steps 1318 and 1320, the data may be automatically captured by the merchant system 1304 (e.g., via camera, or other suitable sensors).

At 1322, the control circuitry of the merchant system, upon receiving or acquiring user data and vehicle data, hashes user and vehicle data (user identification information and vehicle identification information). Further, at 1324, the control circuitry of the merchant system compares the hashed user and vehicle data to stored hashed user and vehicle data. (In some embodiments, the hashing step may be optional, and merchant system 1304 may compare the data to stored data directly). The stored hashed user and vehicle data may be stored from the previous transaction or from an account created by the user with the merchant. At 1326, in response to the hashed user and vehicle data matching the stored user and vehicle data, the control circuitry of the merchant system authorizes the transaction. Then, at 1328, the control circuitry of the merchant system sends a confirmation of the transaction to the vehicle system. At this point the transaction may complete (e.g., vehicle system may be charged a fee for using merchant's service or receiving merchant's products).

Figure 14:
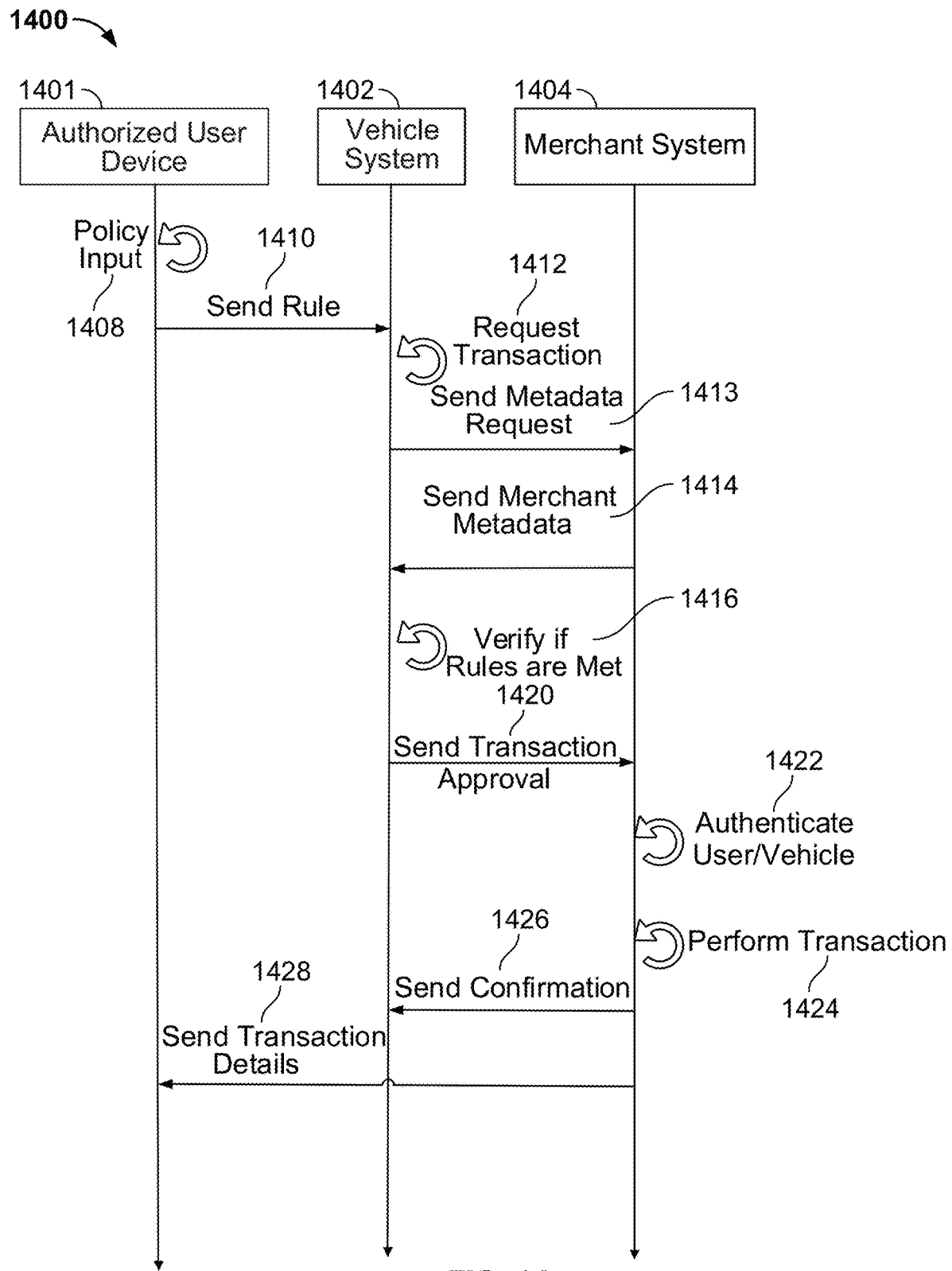
FIG. 14 is a flowchart of a detailed illustrative process for completing a transaction with multiple devices between the authorized user device and the vehicle system, in accordance with some embodiments of the present disclosure.

FIG. 14 shows a processing flow 1400 for completing a transaction with an authorized user device 1401, a vehicle system 1402 associated with a vehicle and a merchant system 1404 associated with a merchant, in accordance with some embodiments of the present disclosure. It should be noted that process 1400 or any step thereof could be performed on, or provided by, the system of FIGS. 3 and 4 or any of the devices shown in FIGS. 1, 2 and 6-9. In some embodiments, the steps of process 1400 are performed as described in discussion of FIG. 1. For example, process 1400 may be executed by devices 402, 403, 404, 414 or 422 (e.g., via control circuitry 312) and/or control circuitry of the vehicle system, as instructed by an authentication application that may be implemented on the authorized user device 1401 and/or vehicle system 1402, and/or merchant system 1404, such as to distribute control of database management application operations for a target device among multiple devices. In addition, one or more steps of process 1400 may be incorporated into or combined with one or more steps of any other process or embodiment (e.g., process 1100 of FIG. 11, process 1200 of FIG. 12, process 1300 of FIG. 13, process 1500 of FIG. 15 or process 1600 of FIG. 16).

At 1408, a policy is inputted into the authorized user device 1401. The policy may provide a permitted vehicle that may be used to complete a transaction, a permitted user that may complete the transaction along with the permitted vehicle, and a rule associated with the policy (e.g., specific merchant, budget limit, etc.). At 1410, the control circuitry of the authorized user device 1401 may send the rule via a communication network to the vehicle system 1402. At 1412, the control circuitry of the vehicle system 1402 may request a transaction. At 1413, the control circuitry of the vehicle system 1402 sends metadata of the requests to the control circuitry of the merchant system 1404. In some embodiments, the control circuitry of the merchant system acquires the user data and vehicle data via a camera or other suitable sensors. The metadata includes the user data associated with the transaction. For example, the merchant system requests the user data for authentication. The user may provide the user data via a vehicle interface, or via a merchant portal. The metadata may include the vehicle data associated with the transaction. The merchant system may capture the vehicle's information as the vehicle approaches the merchant, via a communication network (e.g., merchant may request that car identify itself via near-field network, for example, by providing its VIN) or a camera that can distinguish vehicle make, color, and/or license plate. In some embodiments, instead of the data being sent in step 1413, the data may be automatically captured, by merchant system 1404 (e.g., via camera, or other suitable sensors).

At 1414, the control circuitry of the merchant system 1404 sends merchant metadata (e.g., merchant name, merchant type, merchant location, etc.) to the control circuitry of the vehicle system 1402. At 1416, the control circuitry of the vehicle system 1402 verifies if the rule is met. For example, the vehicle system verifies that the rule is satisfied, for example, the budget is not exceeded, or the merchant is the approved merchant from the rule. Upon the rule being satisfied, at 1420, the control circuitry of the vehicle system 1402 sends transaction approval to the control circuitry of the merchant system 1404.

At 1422, the control circuitry of the merchant system 1404 authenticates the vehicle and user. In some embodiments, the control circuitry of the merchant system 1404 hashes user and vehicle data (user identification information and vehicle identification information). The control circuitry of the merchant system 1404 compares the hashed user and vehicle data to stored hashed user and vehicle data. (In some embodiments, the hashing step may be optional, and merchant system 1404 and may compare the data to stored data directly). For example, the merchant system 1404 verifies that the permitted vehicle is at the merchant, the permitted user is in the vehicle at the merchant, and that the rule is satisfied (e.g., budget not exceeded). In some embodiments, the control circuitry of the merchant system 1404 may request the user to enter user data, and/or the vehicle system may optionally prompt the user to enter user data to authenticate the transaction. In some embodiments, the user and vehicle data are hashed to protect the security of the user and vehicle. In some embodiments, the user may provide a PIN or password via vehicle's interface or via merchant-provided interface.

At 1424, the control circuitry of the merchant system 1404 performs the transaction. Further, at 1426, the control circuitry of the merchant system 1404 sends confirmation of the transaction to the vehicle system 1402. Separately, or in addition to 1426, at 1428, the control circuitry of the merchant system 1404 sends the transaction details to the authorized user device 1401. At this point the transaction may complete (e.g., vehicle system 1402 may be charged a fee for using merchant's service or receiving merchant's products).

Figure 15:
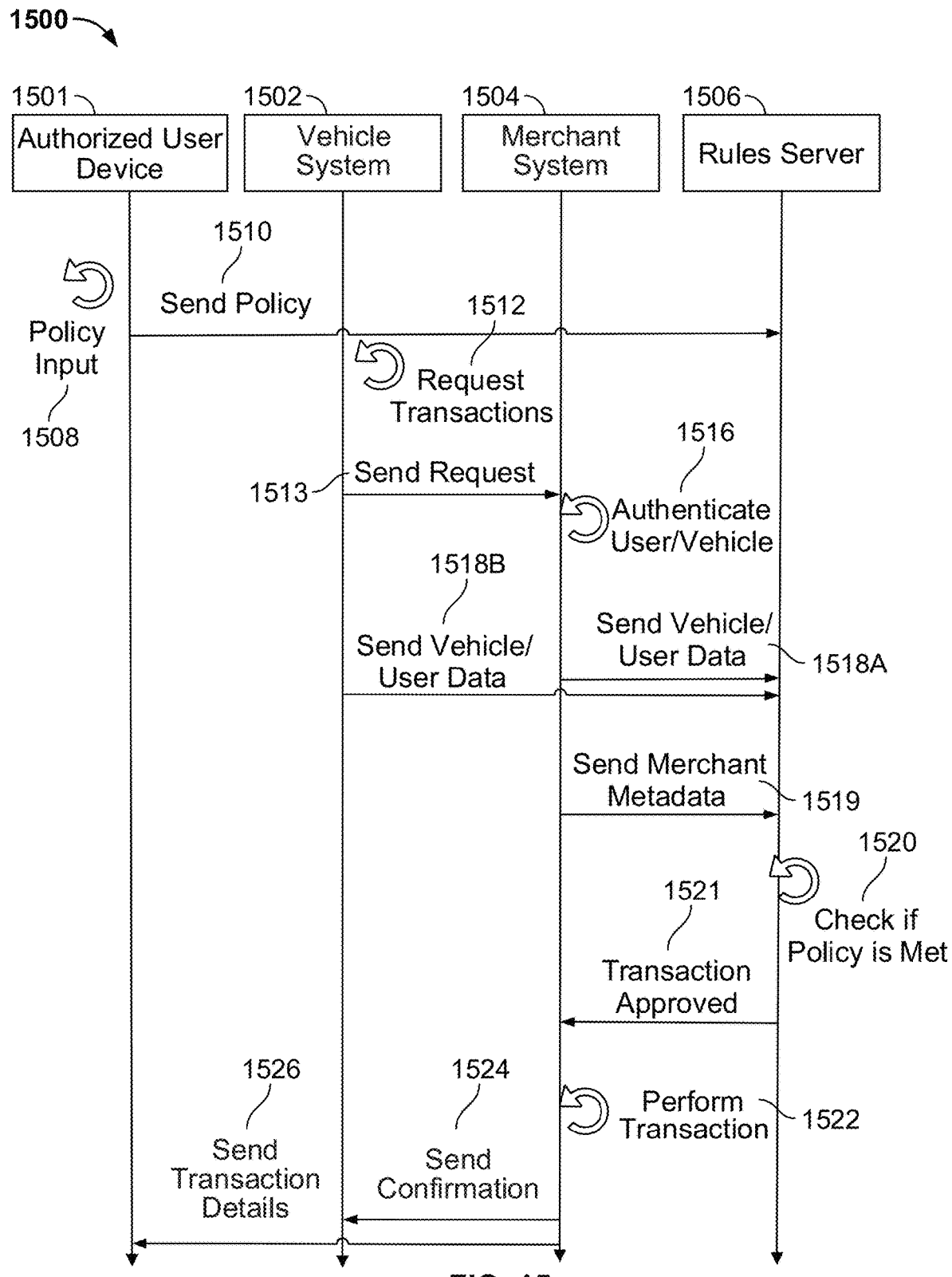
FIG. 15 is a flowchart of a detailed illustrative process for completing a transaction with multiple devices between the authorized user device and the merchant system, in accordance with some embodiments of the present disclosure.

FIG. 15 shows a processing flow 1500 for completing a transaction with an authorized user device 1501, a vehicle system 1502 associated with a vehicle, a merchant system 1504 associated with a merchant and a rules server 1506, in accordance with some embodiments of the present disclosure. The rules server may be operated in cloud-based storage, the vehicle system, or the merchant system. It should be noted that process 1500 or any step thereof could be performed on, or provided by, the system of FIGS. 3 and 4 or any of the devices shown in FIGS. 1, 2, and 6-9. For example, process 1500 may be executed by devices 402, 403, 404, 414 or 422 (e.g., via control circuitry 312) and/or control circuitry of the vehicle system, as instructed by an authentication application that may be implemented on the authorized user device 1501 and/or vehicle system 1502, and/or merchant system 1504 and/or rules server 1506, such as to distribute control of database management application operations for a target device among multiple devices. In addition, one or more steps of process 1500 may be incorporated into or combined with one or more steps of any other process or embodiment (e.g., process 1100 of FIG. 11, process 1200 of FIG. 12, process 1300 of FIG. 13, process 1400 of FIG. 14 or process 1600 of FIG. 16).

At 1508, a policy is inputted into the authorized user device 1501. The policy may provide a permitted vehicle that may be used to complete a transaction, a permitted user that may complete the transaction along with the permitted vehicle, and a rule associated with the policy (e.g., specific merchant, budget limit, etc.). At 1510, the control circuitry of the authorized user device 1501 may send the policy to the rules server 1506. At 1512, the control circuitry of the vehicle system 1502 may request a transaction. At 1513, the control circuitry of the vehicle system 1502 sends a request to the control circuitry of the merchant system 1504. The request may include the user data associated with the transaction. The user may provide the user data via a vehicle interface, or via a merchant portal. The request may include the vehicle data associated with the transaction. The merchant system may capture the vehicle's information as the vehicle approaches the merchant, via a communication network (e.g., merchant may request that car identify itself via near-field network, for example, by providing its VIN) or a camera that can distinguish vehicle make, color, and/or license plate.

At 1516, the control circuitry of the merchant system 1504 authenticates the vehicle and user. In some embodiments, the control circuitry of the merchant system 1504 may request the user to enter user data, and/or the vehicle system may optionally prompt the user to enter user data to authenticate the transaction. For example, the merchant system 1504 verifies that the permitted vehicle is at the merchant, and the permitted user is in the vehicle at the merchant. In some embodiments, the control circuitry of the merchant system 1504 hashes user and vehicle data (user identification information and vehicle identification information). The control circuitry of the merchant system 1504 compares the hashed user and vehicle data to stored hashed user and vehicle data. (In some embodiments, the hashing step may be optional and merchant system 1504 and may compare the data to stored data directly). In some embodiments, the user may provide a PIN or password via vehicle's interface or via merchant-provided interface. In some embodiments, instead of the data being sent in step 1518, the data may be automatically captured, by merchant system 1504 (e.g., via camera, or other suitable sensors).

At 1518A, the control circuitry of the merchant system 1504 sends vehicle and user data 1518A to the control circuitry of the rules server 1506. In some embodiments, the control circuitry of the vehicle system 1502 sends vehicle and user data 1518B to the control circuitry of the rules server 1506. At 1519, the control circuitry of the merchant system 1504 sends merchant metadata (e.g., merchant name, merchant type, merchant location, etc.) to the control circuitry of the rules server 1506. At 1520, the control circuitry of the rules server 1506 verifies if the policy is met. For example, the vehicle system verifies that the rule is satisfied by the budget not being exceeded, or the merchant is an approved merchant from the rule. Upon the rule being satisfied, at 1521, the control circuitry of the rules server 1506 sends transaction approval to the control circuitry of the merchant system 1504. At 1522, the control circuitry of the merchant system 1504 performs the transaction. Further, at 1524, the control circuitry of the merchant system 1504 sends confirmation of the transaction to the vehicle system 1502. Separately, or in addition to 1524, at 1526, the control circuitry of the merchant system 1504 sends the transaction details to the authorized user device 1501. At this point the transaction may complete (e.g., vehicle system 1502 may be charged a fee for using merchant's service or receiving merchant's products).

Figure 16:
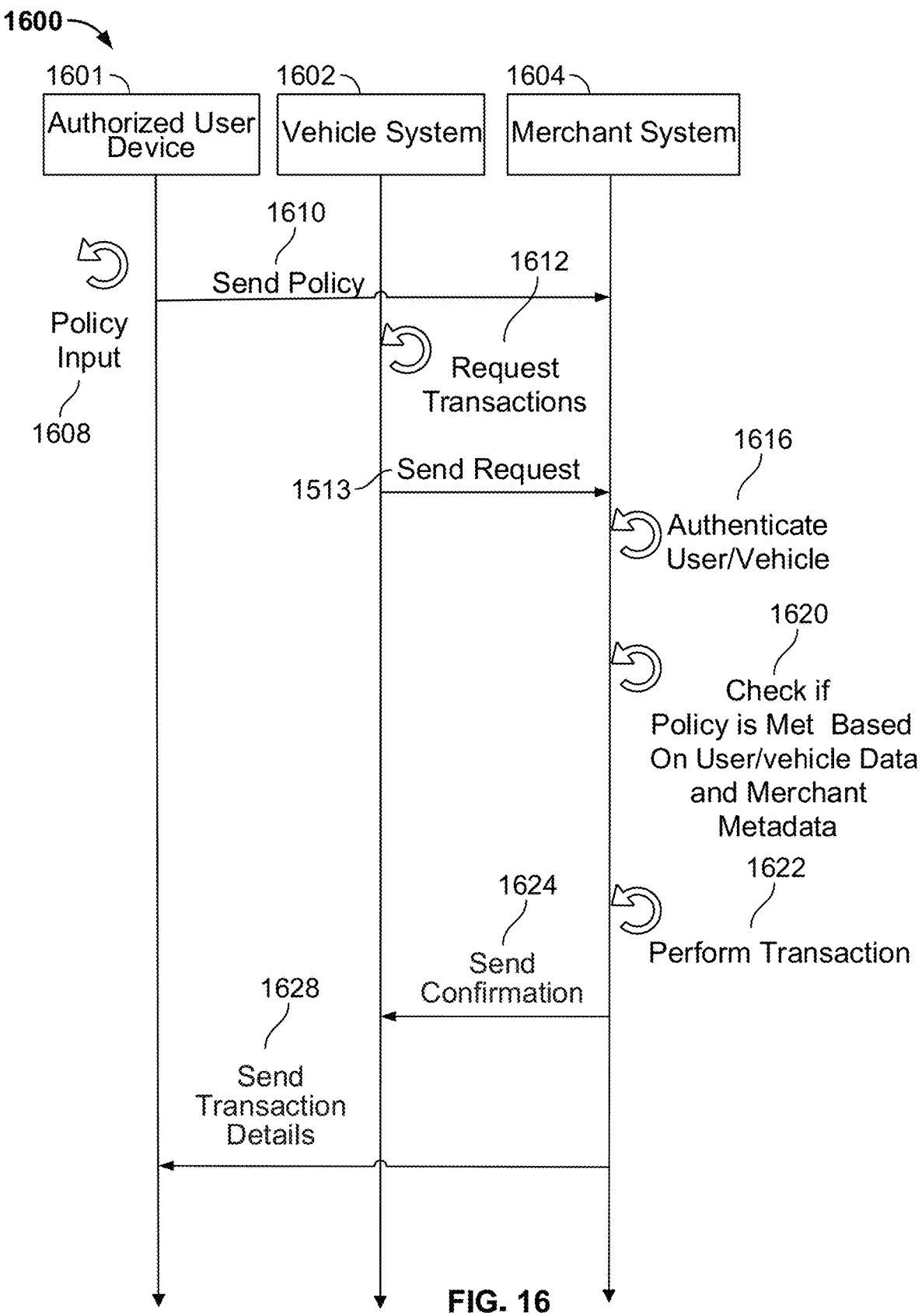
FIG. 16 is a flowchart of a detailed illustrative process for completing a transaction with multiple devices between the authorized user device and the rules server, in accordance with some embodiments of the present disclosure.

FIG. 16 shows a processing flow 1600 for completing a transaction with an authorized user device 1601, a vehicle system 1602 associated with a vehicle and a merchant system 1604, in accordance with some embodiments of this present disclosure. It should be noted that process 1600 or any step thereof could be performed on, or provided by, the system of FIGS. 3 and 4 or any of the devices shown in FIGS. 1, 2 and 6-9. For example, process 1600 may be executed by devices 402, 403, 404, 414 or 422 (e.g., via control circuitry 312) and/or control circuitry of the vehicle system, as instructed by an authentication application that may be implemented on the authorized user device 1601, and/or vehicle system 1602, and/or merchant system 1604, such as to distribute control of database management application operations for a target device among multiple devices. In addition, one or more steps of process 1600 may be incorporated into or combined with one or more steps of any other process or embodiment (e.g., process 1100 of FIG. 11, process 1200 of FIG. 12, process 1300 of FIG. 13, process 1400 of FIG. 14 or process 1500 of FIG. 15).

At 1608, a policy is inputted into the authorized user device 1601. The policy may provide a permitted vehicle that may be used to complete a transaction, a permitted user that may complete the transaction along with the permitted vehicle, and a rule associated with the policy (e.g., specific merchant, budget limit, etc.). At 1610, the control circuitry of the authorized user device 1601 may send the rule to the vehicle system 1602. At 1612, the control circuitry of the vehicle system 1602 may request a transaction. At 1613, the control circuitry of the vehicle system 1602 sends the requests to the control circuitry of the merchant system 1604. The request may include the user data associated with the transaction. The user may provide the user data via a vehicle interface, or via a merchant portal. The request may include the vehicle data associated with the transaction. The merchant system may capture the vehicle's information as the vehicle approaches the merchant, via a communication network (e.g., merchant may request that car identify itself via near-field network, for example, by providing its VIN) or a camera that can distinguish vehicle make, color, and/or license plate.

At 1616, the control circuitry of the merchant system 1604 authenticates the vehicle and user. In some embodiments, the control circuitry of the merchant system 1604 may request the user to enter user data, and/or the vehicle system may optionally prompt the user to enter user data to authenticate the transaction. For example, the merchant system 1604 verifies that the permitted vehicle is at the merchant, and the permitted user is in the vehicle at the merchant. In some embodiments, the control circuitry of the merchant system 1604 hashes user and vehicle data (user identification information and vehicle identification information). The control circuitry of the merchant system 1604 compares the hashed user and vehicle data to stored hashed user and vehicle data. (In some embodiments, the hashing step may be optional and merchant system 1604 and may compare the data to stored data directly). In some embodiments, the user may provide a pin or password via the vehicle's interface or via merchant-provided interface. In some embodiments, instead of the data being sent in step 1618, the data may be automatically captured, by merchant system 1604 (e.g., via camera, or other suitable sensors).

At 1620, the control circuitry of the merchant system 1604 verifies if the policy is met based on user and vehicle data and merchant metadata. For example, the vehicle system verifies that the rule is satisfied by the budget not being exceeded, or the merchant is an approved merchant from the rule. Upon the policy being satisfied, at 1622, the control circuitry of the merchant system 1604 performs the transaction. Further, at 1624, the control circuitry of the merchant system 1604 sends confirmation of the transaction to the vehicle system 1602. Separately, or in addition to 1624, at 1626, the control circuitry of the merchant system 1504 sends the transaction details to the authorized user device 1601. At this point the transaction may complete (e.g., vehicle system 1602 may be charged a fee for using merchant's service or receiving merchant's products).

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to or used in accordance with other systems and/or methods.

What is claimed is:

1. A method comprising:
   generating, by a server, for display on a policy setter user device, a policy setter user interface, wherein the policy setter user interface comprises simultaneous display of:
   (a) a plurality of vehicle identifiers;
   (b) a plurality of user identifiers; and
   (c) a plurality of rules;
   receiving, by the server, via a selection on the policy setter user interface, a policy from the policy setter user device, wherein the policy identifies: a vehicle selected from the plurality of vehicle identifiers, a user selected from the plurality of user identifiers, and a rule selected from the plurality of rules, and wherein the rule comprises approved merchant criteria for a potential transaction request;
   receiving, by the server from the vehicle, a transaction request for a merchant, the transaction request identifying the user and the vehicle;
   retrieving, by the server, merchant-type metadata associated with the merchant;
   receiving, by the server, vehicle location data via a first network for the vehicle identified by the transaction request;
   receiving, by the server, user location data via a second network different from the first network for the user identified by the transaction request;
   determining, by the server, whether both the vehicle location data received via the first network and the user location data received via the second network different from the first network are proximate to a location of the merchant;
   in response to the determining that both the vehicle location data received via the first network and the user location data received via the second network different from the first network are proximate to the location of the merchant, verifying, by the server, based on the merchant-type metadata, whether the approved merchant criteria for the rule is satisfied; and
   in response to verifying that the approved merchant criteria for the rule is satisfied, approving, by the server, the transaction request to cause a device associated with the merchant to complete the transaction request.

2. The method of claim 1, wherein receiving the transaction request further comprises:
   determining that the user identified by a permission has received acceptance from an authorized user to complete the transaction request from the merchant,
   in response to the determining, transmitting to the merchant the transaction request to complete the transaction request.

3. The method of claim 1, wherein the receiving the policy comprises:
computing a vehicle hash based on the received vehicle;
computing a user hash based on the received user; and
comparing the vehicle hash and the user hash to permitted user information and permitted vehicle information.

4. The method of claim 3, wherein computing the vehicle hash comprises hashing one or more of: a vehicle identification number (VIN), a vehicle type, a vehicle color, a vehicle license plate.

5. The method of claim 3, wherein computing the user hash comprises hashing one or more of: a biometric marker, a password, a pin, an identification (ID) received from a mobile device of the user.

6. The method of claim 5, wherein the biometric marker comprises one or more of: a fingerprint, palm veins, face recognition, palmprint, hand geometry, iris recognition, and retina recognition.

7. The method of claim 1, wherein the rule further comprises one or more of: a budget criteria, a time criteria, or a geographical criteria.

8. The method of claim 1, wherein the determining that both the vehicle identified by the transaction request and the user identified by the transaction request are proximate to the location of the merchant further comprises:
determining a geographical location of the merchant; and
determining that the vehicle location data and the user location data are within a threshold distance of the geographical location of the merchant.

9. The method of claim 8, further comprising:
determining that the user is proximate to the vehicle, wherein the determining comprises:
identifying, via camera, a facial identification of the user in the vehicle.

10. The method of claim 1, further comprising:
receiving a request to alter the policy, by changing the user, the vehicle or the rule; and
authorizing the altered policy.

11. A system comprising:
input/output circuitry configured to:
generate, by a server, for display on a policy setter user device, a policy setter user interface, wherein the policy setter user interface comprises simultaneous display of:
(a) a plurality of vehicle identifiers;
(b) a plurality of user identifiers; and
(c) a plurality of rules;
receive, via a selection on the policy setter user interface, a policy from the policy setter user device, wherein the policy identifies: a vehicle selected from the plurality of vehicle identifiers, a user selected from the plurality of user identifiers, and a rule selected from the plurality of rules, and wherein the rule comprises approved merchant criteria for a potential transaction request;
receive, from the vehicle, a transaction request for a merchant, the transaction request identifying the user and the vehicle;
retrieve merchant-type metadata associated with the merchant;
receive vehicle location data via a first network for the vehicle identified by the transaction request;
receive user location data via a second network different from the first network for the user identified by the transaction request;
processing circuitry configured to:
verify based on the merchant-type metadata whether the approved merchant criteria for the rule is satisfied;
determine whether both the vehicle location data received via the first network and the user location data received via the second network different from the first network are proximate to a location of the merchant;
in response to the determining that both the vehicle location data received via the first network and the user location data received via the second network different from the first network are proximate to the location of the merchant, verify, based on the merchant-type metadata, whether the approved merchant criteria for the rule is satisfied; and
in response to verifying that the approved merchant criteria for the rule is satisfied, approve the transaction request to cause a device associated with the merchant to complete the transaction request.

12. The system of claim 11, wherein the processing circuitry is configured to receive a permission to complete the transaction by:
determining that the user identified by the permission has received acceptance from an authorized user to complete the transaction request from the merchant,
in response to the determining, transmitting to the merchant the transaction request to complete the transaction request.

13. The system of claim 11, wherein the processing circuitry is further configured to, in response to the input/output circuitry receiving the policy:
compute a vehicle hash based on the received vehicle;
compute a user hash based on the received user; and
compare the vehicle hash and the user hash to permitted user information and permitted vehicle information.

14. The system of claim 13, wherein the processing circuitry is configured to compute the vehicle hash comprises hashing one or more of: a vehicle identification number (VIN), a vehicle type, a vehicle color, a vehicle license plate.

15. The system of claim 13, wherein the processing circuitry is configured to compute the user hash comprises hashing one or more of: a biometric marker, a password, a pin, an identification (ID) received from a mobile device of the user.

16. The system of claim 15, wherein the biometric marker comprises one or more of: a fingerprint, palm veins, face recognition, palmprint, hand geometry, iris recognition, and retina recognition.

17. The system of claim 11, wherein the rule further comprises one or more of a budget criteria, a time criteria, or a geographical criteria.

18. The system of claim 11, wherein the processing circuitry is configured to determine that both the vehicle identified by the transaction request and the user identified by the transaction request are proximate to the location of the merchant by:
determining a geographical location of the merchant; and
determining that the vehicle location data and the user location data are within a threshold distance of the geographical location of the merchant.

19. The system of claim 18, wherein the processing circuitry is further configured to:
determine that the user is proximate to the vehicle, wherein the determining comprises identifying, via camera, a facial identification of the user in the vehicle.

20. The system of claim 11, wherein the processing circuitry is further configured to:
  receive a request to alter the policy, by changing the user, the vehicle or the rule; and
  authorize the altered policy.

* * * * *